United States Patent
Wang et al.

(10) Patent No.: US 12,003,286 B2
(45) Date of Patent: Jun. 4, 2024

(54) ONLINE MIMO WIRELESS NETWORK VIRTUALIZATION WITH UNKNOWN CHANNEL INFORMATION

(71) Applicant: Telefonaktiebolaget LM Ericsson (publ), Stockholm (SE)

(72) Inventors: Juncheng Wang, Toronto (CA); Ben Liang, Whitby (CA); Min Dong, Whitby (CA); Gary Boudreau, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/425,427

(22) PCT Filed: Apr. 10, 2020

(86) PCT No.: PCT/IB2020/053454
§ 371 (c)(1),
(2) Date: Jul. 23, 2021

(87) PCT Pub. No.: WO2020/208607
PCT Pub. Date: Oct. 15, 2020

(65) Prior Publication Data
US 2022/0103210 A1 Mar. 31, 2022

Related U.S. Application Data

(60) Provisional application No. 62/833,307, filed on Apr. 12, 2019.

(51) Int. Cl.
*H04B 7/02* (2018.01)
*H04B 7/0426* (2017.01)
(Continued)

(52) U.S. Cl.
CPC ......... *H04B 7/0426* (2013.01); *H04B 7/0456* (2013.01); *H04B 7/0626* (2013.01); *H04W 24/02* (2013.01); *H04W 72/541* (2023.01)

(58) Field of Classification Search
CPC .. H04B 7/0426; H04B 7/0456; H04B 7/0626; H04W 24/02; H04W 72/08
(Continued)

(56) References Cited

U.S. PATENT DOCUMENTS

| 9,979,458 B1 | 5/2018 | Sivasivaganesan et al. |
| 2012/0002743 A1 | 1/2012 | Cavalcante et al. |

(Continued)

FOREIGN PATENT DOCUMENTS

| CN | 105163380 A | 12/2015 |
| WO | 2018207031 A1 | 11/2018 |

OTHER PUBLICATIONS

International Search Report and Written Opinion dated Jun. 9, 2020 issued in PCT Application No. PCT/IB2020/053454, consisting of 15 pages.

(Continued)

*Primary Examiner* — Helene E Tayong
(74) *Attorney, Agent, or Firm* — Weisberg I.P. Law, P.A.

(57) ABSTRACT

A method, system and apparatus are disclosed. According to one aspect, a network node configured to communicate with a wireless device (WD), includes processing circuitry configured to perform downlink wireless network virtualization by minimizing an expected deviation of received signals at WDs subject to network node power constraints.

20 Claims, 19 Drawing Sheets

(51) Int. Cl.
| | |
|---|---|
| *H04B 7/0456* | (2017.01) |
| *H04B 7/06* | (2006.01) |
| *H04W 24/02* | (2009.01) |
| *H04W 72/541* | (2023.01) |

(58) Field of Classification Search
USPC .......................................................... 375/267
See application file for complete search history.

(56) References Cited

U.S. PATENT DOCUMENTS

| | | | | |
|---|---|---|---|---|
| 2014/0177461 | A1 | 6/2014 | Seyedmehdi et al. | |
| 2014/0317241 | A1 | 10/2014 | Zhao et al. | |
| 2017/0019297 | A1* | 1/2017 | Rakib | H04W 88/085 |
| 2017/0064675 | A1* | 3/2017 | Kim | H04W 72/042 |
| 2017/0250739 | A1 | 8/2017 | Guerreiro et al. | |
| 2018/0248639 | A1* | 8/2018 | He | H04W 16/20 |
| 2018/0331731 | A1* | 11/2018 | Boudreau | H04B 7/0452 |
| 2019/0260434 | A1 | 8/2019 | Park et al. | |
| 2023/0014932 | A1 | 1/2023 | Huang et al. | |

OTHER PUBLICATIONS

Sucha Supittayapornpong et al., Quality of Information Maximization for Wireless Networks via a Fully Separable Quadratic Policy; IEEE/ACM Transactions on Networking, vol. 23, No. 2, Apr. 2015, consisting of 13 pages.
Juncheng Wang et al., Online Downlink MIMO Wireless Network Virtualization in Fading Environments, IEEE, 2019, consisting of 5 pages.
Xin Wang et al., Wireless Network Virtualization, Journal of Communications vol. 8, No. 5, May 2013, consisting of 8 pages.
Jonathan van de Belt, et al., Defining and Surveying Wireless Link Virtualization and Wireless Network Virtualization, The Center for Future Networks and Communications, 2017, consisting of 25 pages.
Chengchao Liang et al., Wireless Network Virtualization: A Survey, Some Research Issues and Challenges, IEEE Communications Surveys & Tutorials, consisting of 24 pages.
Matias Richart et al., Resource Slicing in Virtual Wireless Networks: A Survey, IEEE Transactions on Network and Service Management, Sep. 2016, consisting of 14 pages.
V. Jumba et al., Resource Provisioning in Wireless Virtualized Networks via Massive-MIMO, IEEE Wireless Communications Letters, Jun. 2015, consisting of 5 pages.
Chang et al., Energy Efficient Optimization for Wireless Virtualized Small Cell Networks With Large-Scale Multiple Antenna, IEEE Transaction on Communications, 2017, consisting of 12 pages.
Kun Zhu et al., Virtualization of 5G Cellular Networks as a Hierarchical Combinatorial Auction, IEEE Transations on Mobile Computing, 2016, consisting of 16 pages.
Ye Liu et al., Antenna Allocation and Pricing in Virtualized Massive MIMO Networks via Stackelberg Game, IEEE Transactions on Communications, vol. 66, No. 11, Nov. 2018, consisting of 15 pages.
Daniel Tweed et al., Dynamic Resource Allocation for Uplink MIMO NOMA VWN With Imperfect SIC, IEEE International Conference on Communications (ICC), May 2018, consisting of 6 pages.
Saeedeh Parsaeefard et al., Dynamic Resource Allocation for Virtualized Wireless Networks in Massive-MIMO-Aided and Fronthaul-Limited C-RAN, Oct. 2017, consisting of 10 pages.
Mohammadmoein Soltanizadeh et al., Power Minimization in Wireless Network Virtualization With Massive MIMO, Prov. Intel. Conf. Communications Workshop on 5G Architecture, 2018, consisting of 6 pages.
M.J. Neely et al., Stochastic Network Optimization With Application on Communication and Queueing Systems, Morgan & Claypool, 2010, consisting of 211 pages.
Fatemeh Amirnavaei, et al., Online Power Control Optimization for Wireless Transmission With Energy Harvesting and Storage, IEEE Transactions on Wireless Communications, Jul. 2016, consisting of 14 pages.
Panayotis Mertikopoulos et al., Learning to Be Green: Robust Energy Efficiency Maximation in Dynamic MIMO-OFDM Systems, IEEE Journal on Selected Areas in Communications, Apr. 2016, consisting of 25 pages.
Panayotis Mertikopoulos et al., Learning in an Uncertain World: MIMO Covariance Matrix Optimization with Imperfect Feedback, IEEE Transactions on Wireless Communications, Jun. 2017, consisting of 27 pages.
Hao Yu, et al., Dynamic Transmit Covariance Design in MIMO Fading Systems with Unknown Channel Distributions and Inaccurate Channel State Information, IEEE Transactions on Wireless Communications, Jun. 2017, consisting of 16 pages.
Harri Holma et al., UTRAN Long-Term Evolution, WCDMA for UMTS—HSPA Evolution and LTE, John Wieley & Sons, 2010, consisting of 29 pages.
Andrea Goldsmith, Wireless Communications, Stanford University Press, 2005, consisting of 427 pages.
Antonio Assalini et al., Linear MMSE MIMO Channel Estimation with Imperfect Channel Covariance Information, Proc. Intel. Conf. Communications (ICC) Jun. 2009, consisting of 6 pages.
International Search Report and Written Opinion dated Sep. 24, 2020 issued in PCT Application No. PCT/IB2020/053022, consisting of 14 pages.
Shai Shalev-Shwartz, Online Learning and Online Convex Optimization, Benin School of Computer Science and Engineering, The Hebrew University of Jerusalem, Israel, vol. 4, No. 2, Feb. 2012, consisting of 22 pages.
Elad Hazan, Introduction to Online Convex Optimization, Found. Trends Optim. vol. 2, No. 3-4, Aug. 2016, consisting of 178 pages.
Martin Zinkevich, Online Convex Programming and Generalized Infinitesimal Gradient Ascent, Proceedings of the Twentieth International Conference on Machine Learning, Washington, D.C, 2003, consisting of 8 pages.
Mehrdad Mahdavi et al., Trading Regret for Efficiency: Online Convex Optimization with Long Term Constraints, Journal of Machine Learning Research vol. 13, No. 1, Sep. 2012, consisting of 26 pages.
Rodolphe Jennatton, et al., Adaptive Algorithms for Online Convex Optimization with Long-Term Constraints, Proceedings of the International Conference of Machine Learning, 2016, consisting of 10 pages.
Alec Koppel et al., A Saddle Point Algorithm for Networked Online Convex Optimization, IEEE Transactions on Signal Processing, vol. 63, No. 19, Oct. 2015, consisting of 16 pages.
Alec Koppel et al., Proximity Without Consensus in Online Mutiagent Optimization, IEEE Transactions on Signal Processing, vol. 65, No. 12, Jun. 2017, consisting of 16 pages.
Hao Yu et al., A Low Complexity Algorithm with $O(\sqrt{T})$ Regret and Finite Constraint Violations for Online Convex Optimization with Long Term Constraints, Department of Electrical Engineering, University of Southern California, Oct. 2016, consisting of 15 pages.
Michael J. Neely et al., Online Convex Optimization with Time-Varying Constraints, University of Southern California, 2017, consisting of 18 pages.
Xuanyu Cao et al., A Virtual-Queue-Based Algorithm for Constrained Online Convex Optimization With Applications to Data Center Resource Allocation, IEEE Journal of Selected Topics in Signal Processing, vol. 12, No. 4, Aug. 2018, consisting of 14 pages.
Tianyi Chen et al., An Online Convex Optimization Approach to Proactive Network Resource Allocation, IEEE Transactions on Signal Processing, vol. 65, No. 24, Dec. 15, 2017, consisting of 15 pages.
Marcelo J. Weinberger et al., On Delayed Prediction of Individual Sequences, IEEE Trans. Inf. Theory, vol. 48, No. 7, Jul. 2002, consisting of 43 pages.
John Langford et al., Slow Learners are Fast, Machine Learning, Yahoo!, Labs and Australian National University, Proc. Advances in Neural Info. Process Systems, 2009, consisting of 9 pages.

(56) References Cited

OTHER PUBLICATIONS

H. Brendan McMahan et al., Delay-Tolerant Algorithms for Asynchronous Distributed Online Learning, Proc. Advances in Neural Info. Process Systems, 2014, consisting of 9 pages.
Pooria Joulani et al., Delay-Tolerant Online Convex Optimization: Unified Analysis and Adaptive-Gradient Algorithms, Proceedings of the Thirtieth AAAI Conference on Artificial Intelligence (AAAI-16) 2016, consisting of 7 pages.
Kent Quanrud et al., Online Learning with Adversarial Delays, Department of Computer Science, University of Illinois at Urbana-Champaign, Adv. Neural Info. Process Systems, 2015, consisting of 9 pages.
Jim Zyren et al., Overview of the 3GPP Long Term Evolution Physical Layer, Freescale Semiconductor Inc., 2007, consisting of 27 pages.
D.H. Brandwood, A Complex Gradient Operator and its Application in Adaptive Array Theory, IEEE Proceedings H—Microwaves, Optics, and Antennas, Feb. 1983, consisting of 6 pages.
Stephen Boyd, Convex Optimization, Department of Electrical Engineering Stanford University, Cambridge University Press, 2004, consisting of 730 pages.
Michael C. Grant et al., The CVX User's Guide Release 2.1, Dec. 2018, consisting of 99 pages.
Muriel Medard, The Effect Upon Channel Capacity in Wireless Communications of Perfect and Imperfect Knowledge of the Channel, IEEE Transactions on Information Theory, vol. 46, No. 3, May 2000, consisting of 14 pages.
Ibrahim Abou-Faycal et al., Binary Adaptive Coded Pilot Symbol Assisted Modulation Over Rayleigh Fading Channels Without Feedback, IEEE Transactions on Communications, vol. 53, No. 6, Jun. 2005, 11 pages.
Roberto Corvaja et al., Phase Noise Degradation in Massive MIMO Downlink With Zero-Forcing and Maximum Ratio Transmission Precoding, IEEE Transaction on Vehicular Technology, vol. 65, No. 10, Oct. 2016, consisting of 8 pages.
International Search Report and Written Opinion dated Nov. 9, 2021 issued in PCT Application No. PCT/IB2021/057106 filed Aug. 3, 2021, consisting of 17 pages.
Wang et al., Online Precoding Design for Downlink MIMO Wireless Network Virtualization with Imperfect CSI; IEEE INFOCOM 2020; IEEE Conference on Computer Communications, IEEE; Jul. 6, 2020, consisting of 10 pages.
Wang et al., Online MIMO Wireless Network Virtualization Over Time-Varying Channels with Periodic Updates; May 26, 2020 IEEE 21st International Workshop on Signal Processing Advances in Wireless Communication (SPAWC), consisting of 5 pages.
Eric C. Hall et al., Online Convex Optimization in Dynamic Environments, IEEE Journal of Selected Topics in Signal Processing, vol. 9, No. 4, Jun. 2015, consisting of 16 pages.
Ali Jadbabaie et al., Online Optimization: Competing with Dynamic Comparators, Proc. Intel. Conf. Artif. Intell. Statist., May 2015, consisting of 9 pages.
Xuanyu Cao et al., Impact of Delays on Constrained Online Convex Optimization; Proc. Asilomar Conf. Signal Sys. Compu., Nov. 2019, consisting of 4 pages.
David Gesbert et al., Multi-Cell MIMO Cooperative Networks: A New Look at Interference; IEEE Journal on Selected Areas in Communications, vol. 28, No. 9; Dec. 2010, consisting of 29 pages.
Hongyuan Zhang et al., Asynchronous Interference Mitigation in Cooperative Base Station Systems; IEEE Transactions on Wireless Communications, vol. 7, No. 1; Jan. 2008, consisting of 11 pages.
Hayssam Dahrouj et al., Coordinated Beamforming for the Multi-Cell Multi-Antenna Wireless System; IEEE Transactions on Wireless Communications, vol. 9; May 2010, consisting of 6 pages.
Luca Venturino et al., Coordinated Linear Beamforming in Downlink Multi-Cell Wireless Networks; IEEE Transactions on Wireless Communications, vol. 9, No. 4; Apr. 2010, consisting of 11 pages.

Desmond W.H. Cai et al., Max-Min SINR Coordinated Multipoint Downlink Transmission—Duality and Algorithms; IEEE Transactions on Signal Processing, vol. 60, No. 10; Oct. 2012, consisting of 12 pages.
Antti Toskala et al., UTRAN Long-Term Evolution; John Wiley & Sons, Ltd.; 2010, consisting of 29 pages.
Leonidas Georgiadis et al., Resource Allocation and Cross Layer Control in Wireless Networks; Found. Trends Networks; 2006 Now Publishers Inc., consisting of 146 pages.
Tianyi Chen, et al., Stochastic Averaging for Constrained Optimization With Application to Online Resource Allocation; IEEE Transactions on Signal Processing, vol. 65, No. 12; Jun. 2017, consisting of 16 pages.
International Search Report and Written Opinion dated Aug. 31, 2021 issued in PCT Application No. PCT/IB2021/054717, consisting of 13 pages.
N.M. Mosharaf Kabir Chowdhury et al., Network Virtualization: State of the Art and Research Challenges; Topics in Network and Service Management; IEEE Communications Magazine, Jul. 2009, consisting of 7 pages.
Ami Wiesel, et al., Linear Precoding via Conic Optimization for Fixed MIMO Receivers; IEEE Transactions on Signal Processing, vol. 54, No. 1; Jan. 2006, consisting of 16 pages.
Yi Jiang, et al., Performance Analysis of ZF and MMSE Equalizers for MIMO Systems: An In-Depth Study of the High SNR Regime; IEEE Transactions on Information Theory, vol. 57, No. 4; Apr. 2011, consisting of 19 pages.
Oren Somekh, et al., Cooperative Multicell Zero-Forcing Beamforming in Cellular Downlink Channels; IEEE Transactions on Information Theory, vol. 55, No. 7; Jul. 2009, consisting of 14 pages.
Juncheng Wang et al., Online Precoding Design for Downlink MIMO Wireless Network Virtualization with Imperfect CSI; IEEE Int. Conf. Comput. Commun. (INFOCOM), Apr. 2020, consisting of 9 pages.
Wang et al., Online Downlink MIMO Wireless Network Virtualization in Fading Environments; Dec. 9, 2019 IEEE Global Communications Conference (GLOBECOM), IEEE, consisting of 6 pages.
Hao Yu et al., A Low Complexity Algorithm with $O(\sqrt{T})$ Regret and $O(1)$ Constraint Violations for Online Convex Optimization with Long Term Constraints; Journal of Machine Learning Research, vol. 21, Feb. 2020, consisting of 24 pages.
Xin Wang et al., Wireless Network Virtualization; International Conference on Computing, Networking and Communications, Invited Position Papers; Jan. 2013, consisting of 5 pages.
Matias Richart et al., Resource Slicing in Virtual Wireless Networks: A Survey; IEEE Transactions on Network and Service Management, vol. 13, No. 3; Sep. 2016, consisting of 15 pages.
Vikas Jumba et al., Resource Provisioning in Wireless Virtualized Networks via Massive-MIMO; IEEE Wireless Communications Letter, vol. 4, No. 3; Jun. 2015, consisting of 4 pages.
Kun Zhu et al., Virtualization of 5G Cellular Networks as a Hierarchical Combinatorial Auction; IEEE Transactions on Mobile Computing, vol. 15, No. 10; Oct. 2016, consisting of 15 pages.
Hayssam Dahrouj et al., Coordinated Beamforming for the Multi-Cell Multi-Antenna Wireless System; IEEE Transactions on Wireless Communications; 2008, consisting of 6 pages.
Saeedeh Parsaeefard, et al., Dynamic Resource Allocation for Virtualized Wireless Networks in Massive-MIMO-Aided and Fronthaul-Limited C-RAN; IEEE Transactions on Vehicular Technology, vol. 66, No. 10; Oct. 2017, consisting of 9 pages.
Chinese Office Action and Search Report and English Summary translation of the Chinese Office Action dated Dec. 6, 2023 issued in Patent Application No. 202080028258.6, consisting of 11 pages.
Office Action dated Oct. 3, 2023 issued in U.S. Appl. No. 17/789,951, consisting of 29 pages.

* cited by examiner

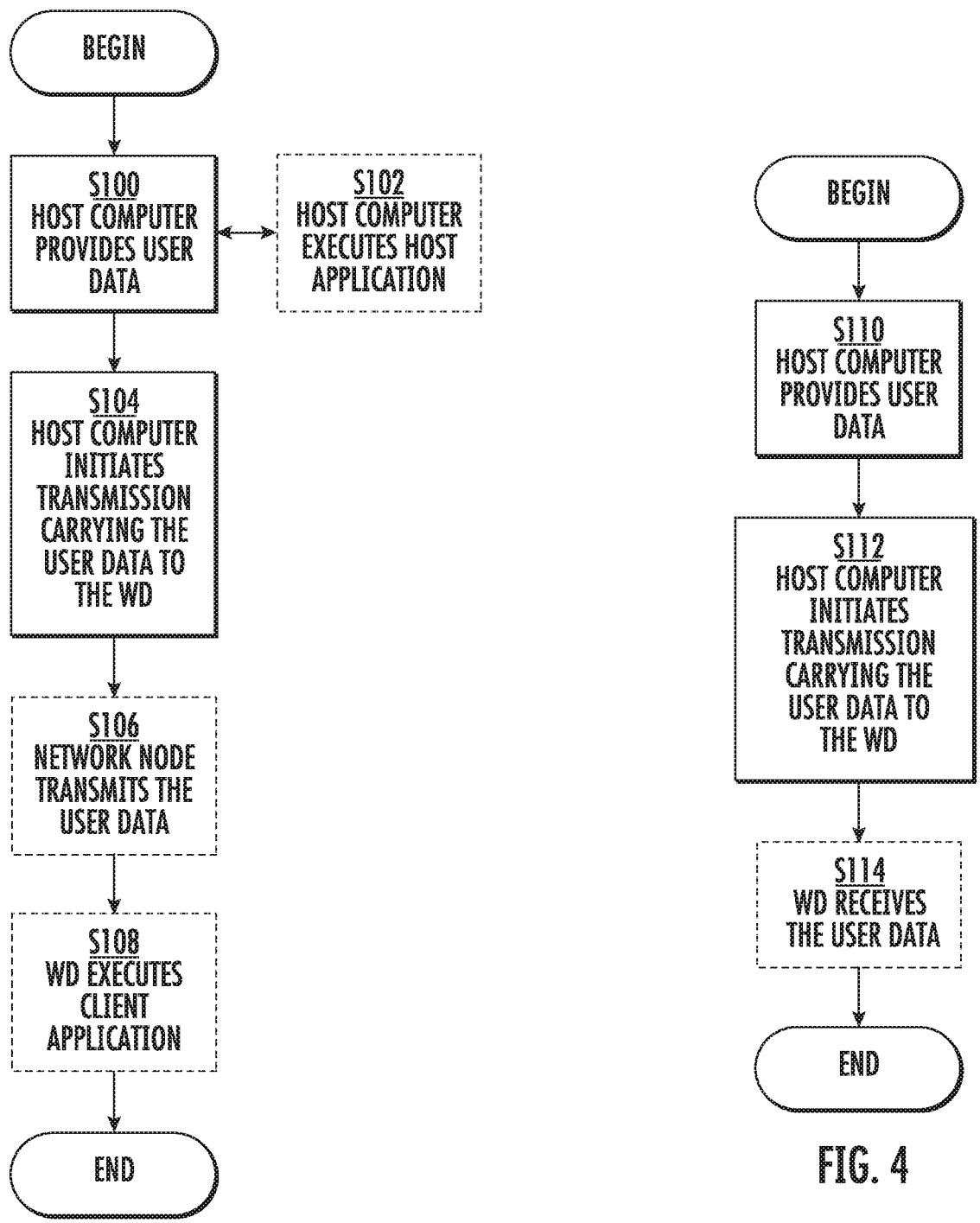

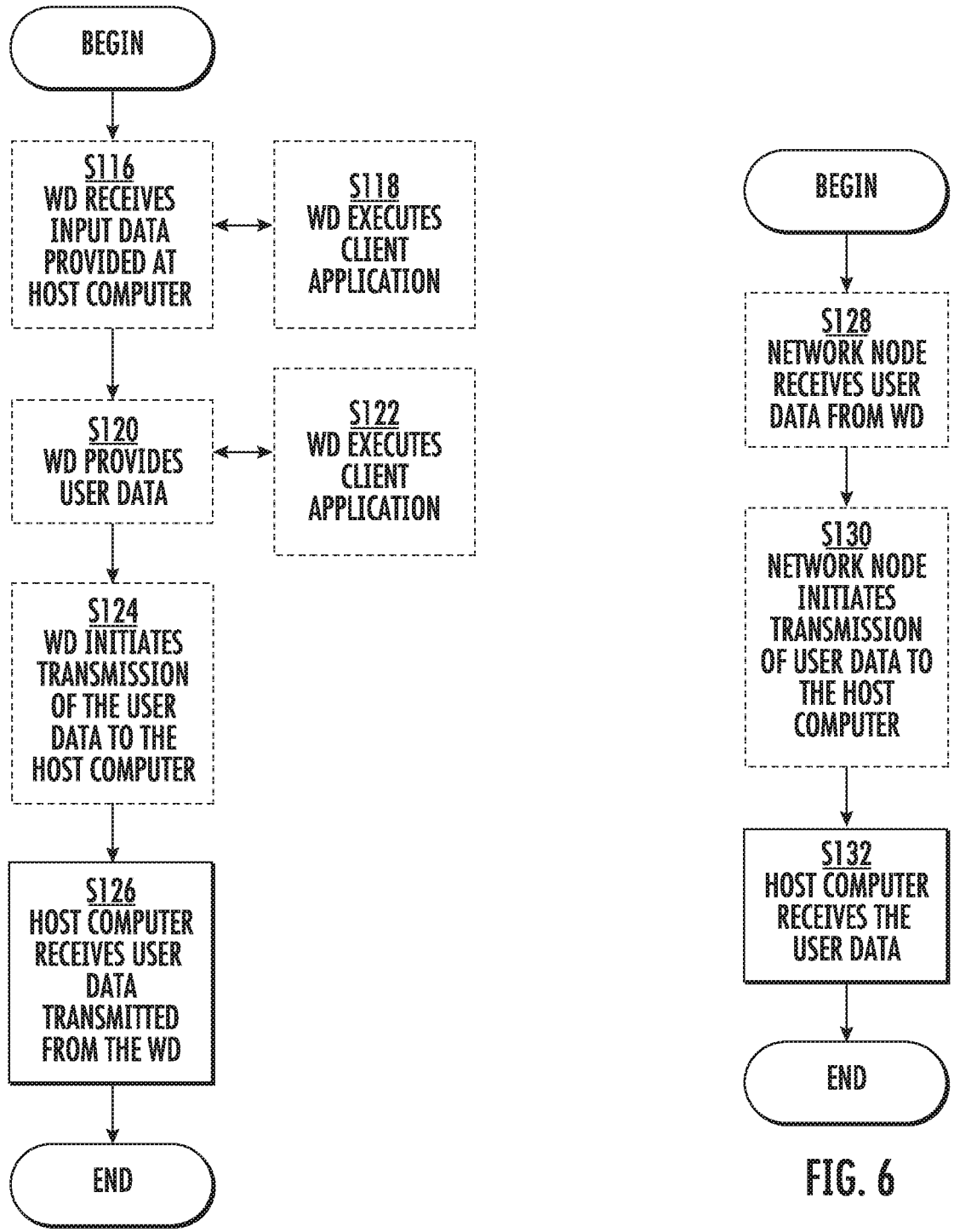

ONLINE MIMO WIRELESS NETWORK VIRTUALIZATION WITH UNKNOWN CHANNEL INFORMATION

CROSS-REFERENCE TO RELATED APPLICATIONS

This application is a Submission Under 35 U.S.C. § 371 for U.S. National Stage Patent Application of International Application No.: PCT/IB2020/053454, filed Apr. 10, 2020 entitled "ONLINE MIMO WIRELESS NETWORK VIRTUALIZATION WITH UNKNOWN CHANNEL INFORMATION," which claims priority to U.S. Provisional Application No. 62/833,307, filed Apr. 12, 2019, entitled "ONLINE MIMO WIRELESS NETWORK VIRTUALIZATION WITH UNKNOWN CHANNEL INFORMATION," the entireties of both of which are incorporated herein by reference.

FIELD

The present disclosure relates to wireless communications, and in particular, to online multiple input multiple output (MIMO) wireless network virtualization (WNV) with unknown channel information.

BACKGROUND

Designers of wireless communication systems have attempted to address the problem of optimal precoding in the downlink of a MIMO base station (BS) under Wireless Network Virtualization (WNV). Such wireless communication systems may include Fourth Generation (4G, also known as Long Term Evolution (LTE)) and Fifth Generation (5G, also known as New Radio (NR)), as specified by the Third Generation Partnership Project (3GPP). In WNV, an Infrastructure Provider (InP) manages the BS (also referred to herein as a network node), and multiple Service Providers (SPs) utilize the hardware resources provided by the InP (e.g., antennas, power, processing, etc.) to independently serve their own subscribing users. The SPs are agnostic to the presence of each other.

Each SP receives channel information and power limitation information from the InP and decides its own precoding matrix to satisfy the service demand of its users. To maximize hardware and spectral usage, assume that the SPs simultaneously share all of the InP's antennas and available spectrum. Since the SPs design their precoding matrices independently of each other, they can create damaging interference to each other's users, unless the InP appropriately coordinates the signals of the SPs.

The InP collects the SP-designed precoding matrices (which may be viewed as virtual), and the InP attempts to design the actual precoding matrix between its antennas and the users of all SPs. The objective is to provide effective service to each user that closely follows the demand from the SPs (as described by their virtual precoding matrices). Therefore, a concern of the InP precoding design is to reduce the interference between the SPs.

The challenges are multi-fold: (1) The InP has short-term and long-term power constraints. In particular, satisfying the long-term power constraint requires a dynamic solution that takes into account the unpredictable channel variation in time, which is generally termed online optimization in the research literature; (2) The Channel Distribution Information (CDI) often is not available, which calls for some adaptive learning approach; and (3) The Channel State Information (CSI) at any time may not be known exactly, and any solution should deal with such uncertainty to provide a bounded performance guarantee.

The framework of WNV enables the sharing of a common network infrastructure as multiple virtual networks. Virtualization creates a set of logical entities from a given set of physical entities in a manner that is transparent to users. By abstracting and slicing the physical resources, WNV reduces the capital and operational expenses of wireless networks that hinder new companies from entering the industry. Further, abstracting and slicing the physical resources enables easier and faster migration to new networking technologies, protocols, and products through isolating distinct parts of the network, while ensuring that existing services are unaffected.

A virtualized wireless network generally includes an InP that owns and manages the network infrastructure, and SPs that utilize the network infrastructure to provide services to their own subscribers. The InPs virtualize the core network and access networks into virtual slices. The SPs lease these virtual network resources and provide services to their own subscribers under their own management, requirements, and characteristic, without the need to know the underlying physical architecture. Although the potential of WNV has been shown, there are still many open issues regarding the resource allocation and isolation of virtual networks. Wireless medium virtualization brings new challenges that do not exist in wired network virtualization, such as signal propagation, interference control, and user mobility. Due to the dynamics and shared nature of the wireless medium, guaranteeing isolation of virtual networks is a difficult task, even more so when accounting for service quality requirements.

Much of the MIMO WNV research and development work is directed to enforcing physical resource isolation by allocating exclusive sub-carriers and subsets of antennas among the SPs following wired network virtualization. This leads to inefficient resource utilization of the scarce wireless spectrum and substantial system throughput loss. The resource allocation problem for WNVs with orthogonal frequency division multiplexing (OFDM) massive MIMO has been studied in an attempt to maximize system throughput and energy efficiency. A two-level hierarchical auction architecture has been proposed to allocate exclusive sub-carriers among the SPs. Antenna allocation and pricing problems for virtualized massive MIMO system has been studied from the economic point of view using game theory. The uplink resource allocation problem in virtualized MIMO combining non-orthogonal multiple access (NOMA) and cloud radio access network (C-RAN) techniques has also been investigated. Furthermore, stochastic robust precoding in massive MIMO WNV has been investigated to allow antenna and spectrum sharing among the SPs, assuming that channel inaccuracy is unbiased.

Existing MIMO WNV schemes have focused on the offline scenario. In these schemes, the system performance optimization is subject to a short-term maximum BS power constraint in a single transmission time slot, overlooking the long-term power constraint. Differentiated from existing short-term resource allocation policies, online MIMO WNV subject to both long-term and short-term base station (BS) power constraints are being investigated. Long-term power constraints may require an online approach to performance optimization.

The Lyapunov optimization technique has been applied to solve online problems in various studies. Online power control for wireless transmission with energy harvesting and storage has been studied. An online projected gradient descent scheme and matrix exponential learning scheme have been studied for MIMO uplink covariance matrix design, considering inaccurate CSI and unbiased channel estimation. Furthermore, dynamic transmit covariance design has been studied with inaccurate CSI and bounded channel estimation inaccuracy. Thus. problems exist with multiple input multiple output (MIMO) wireless network virtualization (WNV).

SUMMARY

Some embodiments advantageously provide methods and network node for online multiple input multiple output (MIMO) wireless network virtualization (WNV) with unknown channel information.

In some embodiments, an online MIMO WNV method, that works under unknown CDI and inaccurate CSI, with a semi-closed form water-filling-like precoding solution and deterministic performance bounds, is provided. This method is designed under the assumption that the unknown true channel gain is bounded and the channel estimation inaccuracy is bounded (i.e., the channel estimation could be biased). Some embodiments provide efficient sharing of the InP's antennas and wireless spectrum resources among multiple SPs. Some embodiments minimize the expected deviation of received signals at the users between the SPs' virtual precoding and the InP's actual precoding, taking into account the inter-SP interference caused by non-awareness of the other SPs. Some embodiments provide an online MIMO WNV method with a semi-closed form water-filling-like precoding solution, subject to both long-term and short-term BS power constraints.

In some embodiments, a method to optimize the downlink precoding of the InP in MIMO WNV is provided. The method aims to minimize the expected deviation of received signals at users between SPs' virtual precoding and InP's actual precoding, considering the inter-SP interference caused by the agnostic behavior of the SPs, subject to both long-term and short-term BS power constraints.

A feature of the method in some embodiments is that the method does not require the channel distribution information (CDI) to be known, and the method allows inaccurate channel state information (CSI). Furthermore, the method accommodates both short-term and long-term power constraints at the base station (BS).

In some embodiments, the method extends the standard drift-plus-penalty (DPP) technique for stochastic network optimization to deal with inaccurate CSI, leading to a semi-closed-form water-filling-like precoding solution. The method can be combined with any method for the SPs to decide their virtual precoding matrices.

The performance of an algorithm used in the method can be bounded when the SPs use either match filtering (MF) or zero forcing (ZF) methods to compute their virtual precoding matrices. The algorithm may have a deterministic $O(\delta)$ performance bound to optimality, where $\delta$ is the relative inaccuracy measure of the CSI, despite the following challenges: 1) the CDI is unknown; 2) the unknown true CSI and the channel inaccuracy are only assumed to be bounded; 3) the SPs are agnostic to each other and design their own virtual precoding matrices requesting the pre-agreed downlink power; and 4) the virtualization demand gathered from the SPs depends on the CSI. Furthermore, the algorithm may also provide strong sample path and convergence time guarantees.

The performance of an embodiment of the algorithm has been validated by simulation under typical long term evolution (LTE) network settings. The validation confirms fast convergence and improved throughput performance under different precoding schemes adopted by the SPs, different average BS power limits, different channel inaccuracies, and different numbers of BS antennas. Furthermore, the algorithm achieves higher system throughput compared with that of a non-virtualized network, even while the virtualization approach provides flexibility for the SPs to independently design their own precoding and hence, service quality for their own subscribers.

According to one aspect, a network node is configured to communicate with a wireless device, WD. The network node includes processing circuitry configured to perform downlink wireless network virtualization by minimizing an expected deviation of received signals at WDs subject to power constraints on the network node.

According to this aspect, in some embodiments, the expected deviation is between a service provider's virtual precoding and an infrastructure provider's actual precoding. In some embodiments, the minimizing is based at least in part on interference between service providers. In some embodiments, the minimizing includes applying a drift-plus-penalty technique for stochastic network optimization based on inaccurate channel state information. In some embodiments, the power constraints include at least one short term power constraint and at least one long term power constraint. In some embodiments, the minimizing is performed without knowledge of channel distribution information. In some embodiments, each service provider independently determines a virtual precoding matrix of the service provider. In some embodiments, a virtual precoding matrix determined by a service provider is associated with a pre-determined downlink power. In some embodiments, the minimizing occurs within a $$O\left(\frac{1}{\epsilon^2}\right)$$

convergence time to reach an $\epsilon$-approximate solution. In some embodiments, the downlink wireless network virtualization is bounded when all service providers' determinations of virtual precoding matrices include match filtering or zero forcing.

According to another aspect, a method in a network node is configured to communicate with a wireless device, WD. The method includes performing downlink wireless network virtualization by minimizing an expected deviation of received signals at WDs subject to power constraints on the network node.

In some embodiments, the expected deviation is between a service provider's virtual precoding and an infrastructure provider's actual precoding. In some embodiments, the minimizing is based at least in part on interference between service providers. In some embodiments, the minimizing includes applying a drift-plus-penalty technique for stochastic network optimization based on inaccurate channel state information. In some embodiments, the power constraints include at least one short term power constraint and at least one long term power constraint. In some embodiments, the minimizing is performed without knowledge of channel distribution information. In some embodiments, each service provider independently determines a virtual precoding matrix of the service provider. In some embodiments, a virtual precoding matrix determined by a service provider is associated with a pre-determined downlink power. In some embodiments, the minimizing occurs within an $$O\left(\frac{1}{\epsilon^2}\right)$$

convergence time to reach an ∈-approximate solution. In some embodiments, the downlink wireless network virtualization is bounded when all service providers' determinations of virtual precoding matrices include match filtering or zero forcing.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

FIG. 5 is a flowchart illustrating exemplary methods implemented in a communication system including a host computer, a network node and a wireless device for receiving user data from the wireless device at a host computer according to some embodiments of the present disclosure;

FIG. 6 is a flowchart illustrating exemplary methods implemented in a communication system including a host computer, a network node and a wireless device for receiving user data at a host computer according to some embodiments of the present disclosure;

DETAILED DESCRIPTION

Figure 1:
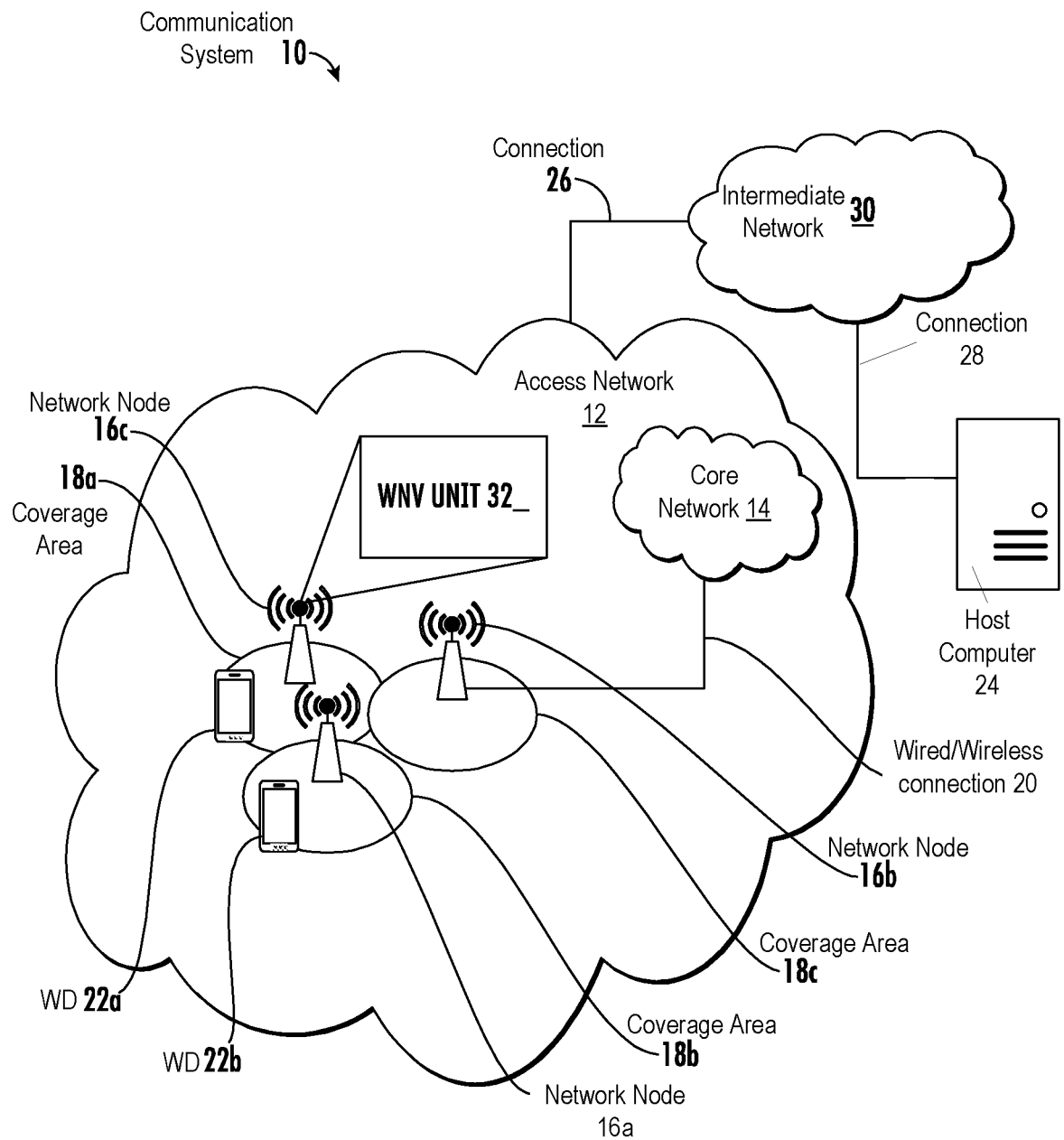
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to online multiple input multiple output (MIMO) wireless network virtualization (WNV) with unknown channel information. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide a virtualized MIMO wireless network that is formed by an InP and several SPs. In each cell, the InP owns the base station and performs virtualization. The SP, being unaware of each other, serve their own subscribers. Other parts of the network, including the core network and computational resources are assumed to be already virtualized. In some embodiments, a network node configured to communicate with a wireless device (WD), includes processing circuitry configured to perform downlink wireless network virtualization by minimizing an expected deviation of received signals at WDs subject to network node power constraints. Note that the algorithms and methods described below may be performed in whole or in part in a core network node or base station or in the cloud.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a WNV unit 32 which is configured to perform downlink wireless network virtualization by optimizing MIMO precoding to minimize an expected deviation of received signals at WDs subject to network node power constraints. In some embodiments, the network node power constraints are considered over a first time interval and a second time interval, where the second time interval is longer than the first time interval.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include WNV unit 32 configured to perform downlink wireless network virtualization by optimizing MIMO precoding to minimize an expected deviation of received signals at WDs subject to network node power constraints. In some embodiments, the network node power constraints are considered over a first time interval and a second time interval, where the second time interval is longer than the first time interval.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 2:
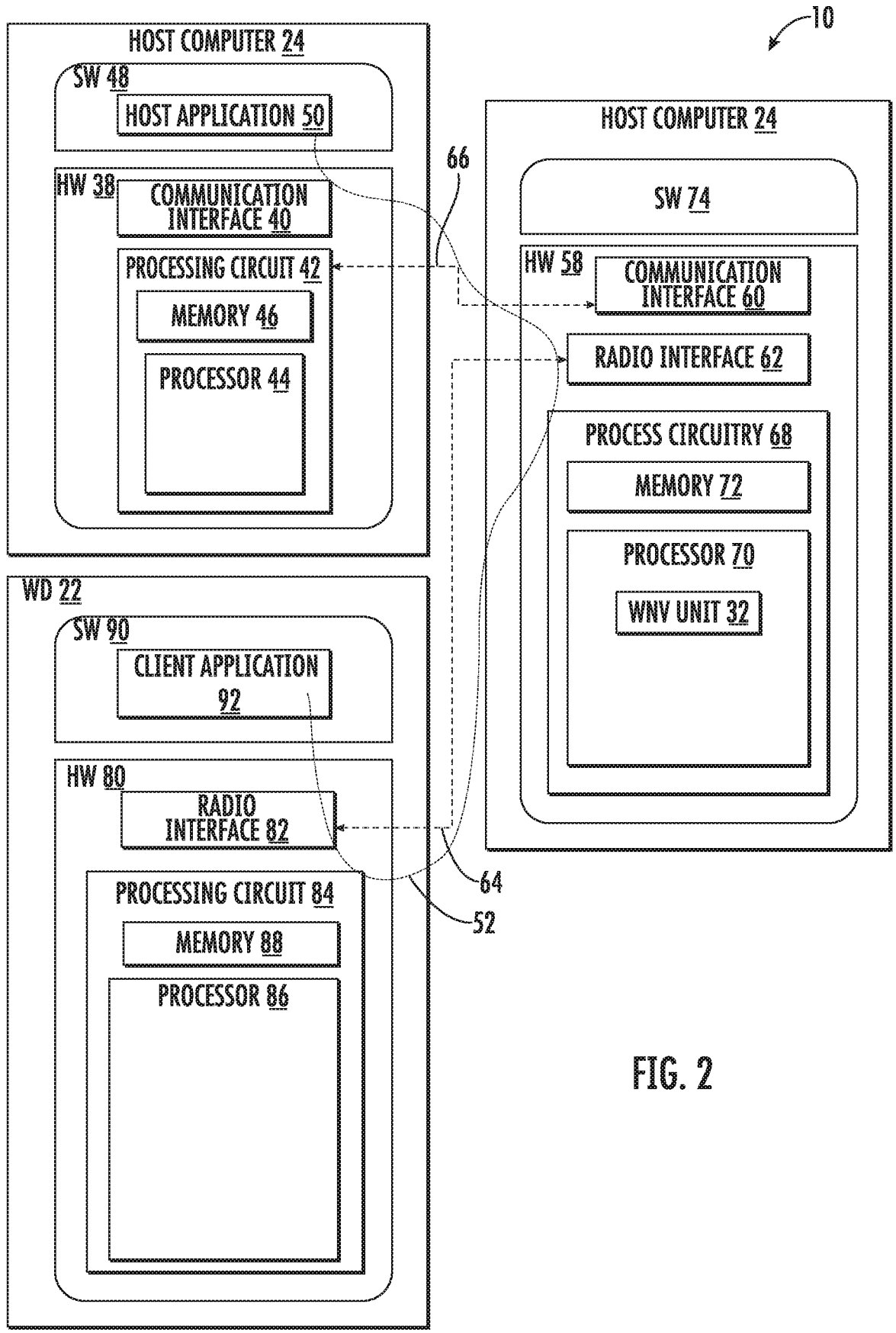
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as WNV unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
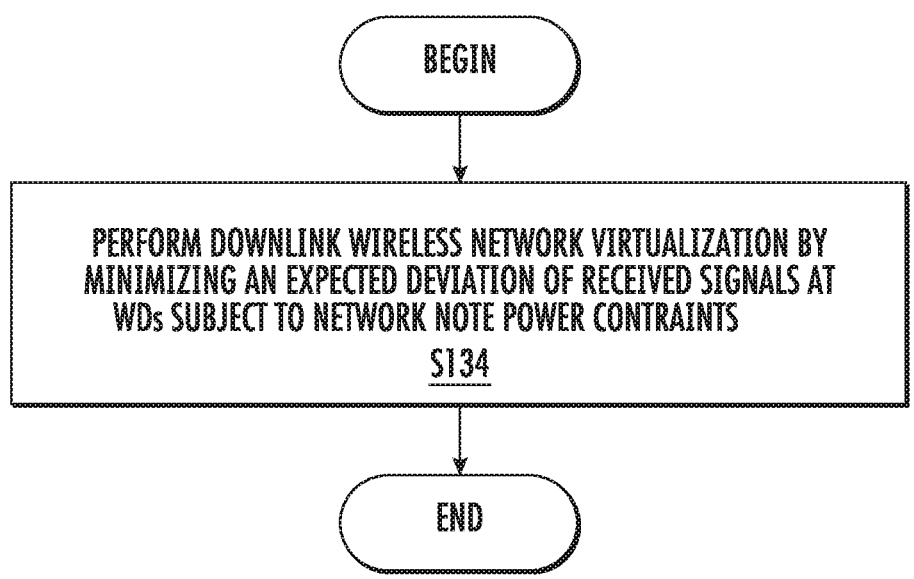
FIG. 7 is a flowchart of an exemplary process in a network node according to some embodiments of the present disclosure.

FIG. 7 is a flowchart of an exemplary process in a network node 16 for online multiple input multiple output (MIMO) wireless network virtualization (WNV) with unknown channel information in accordance with the principles of the present disclosure. One or more blocks described herein may be performed by one or more elements of network node 16 such as by one or more of processing circuitry 68 (including the WNV unit 32), processor 70, radio interface 62 and/or communication interface 60. Network node 16 such as via processing circuitry 68 and/or processor 70 and/or radio interface 62 and/or communication interface 60 is configured to perform downlink wireless network virtualization by minimizing an expected deviation of received signals at WDs subject to network node power constraints (Block S134). In some embodiments, the network node power constraints are considered over a first time interval and a second time interval, where the second time interval is longer than the first time interval.

Having described the general process flow of arrangements of the disclosure and having provided examples of hardware and software arrangements for implementing the processes and functions of the disclosure, the sections below provide details and examples of arrangements for online multiple input multiple output (MIMO) wireless network virtualization (WNV) with unknown channel information.

System Model

Consider downlink transmission in a virtualized cell consisting of an InP that owns a network node 16 equipped with N antennas. Assume that M SPs share the N antennas at the network node 16 and the spectrum resources provided by the InP. $\mathcal{K}$ Each SP m has $K_m$ subscribing users. Let $\mathcal{N} = \{1, \ldots, N\}$, $\mathcal{M} = \{1, \ldots, M\}$, and $\mathcal{K}_m = \{1, \ldots, K_m\}$, m∈ $\mathcal{M}$. There are a total $K = \sum_{m=1}^{M} K_m$ users in the cell and let $\mathcal{K} = \{1, \ldots, K\}$. Assume K≤N.

Consider a slotted system. Let $H(t) \in \mathbb{C}^{K \times N}$ denote the MIMO channel between network node 16 and all K users at time slot t. Assume a MIMO block fading channel model, where H(t) remains constant in each block and changes from block to block independently. Thus, H(t) over time slots is independent and identically distributed (i.i.d.). The probability distribution of H(t) can be arbitrary but is unknown. Assume at any given time slot that the channel gain is bounded by a constant B as $$\|H(t)\|_F \leq B, \forall t \geq 0 \quad (1)$$

which holds in practical systems as the channel attenuates signals.

Figure 8:
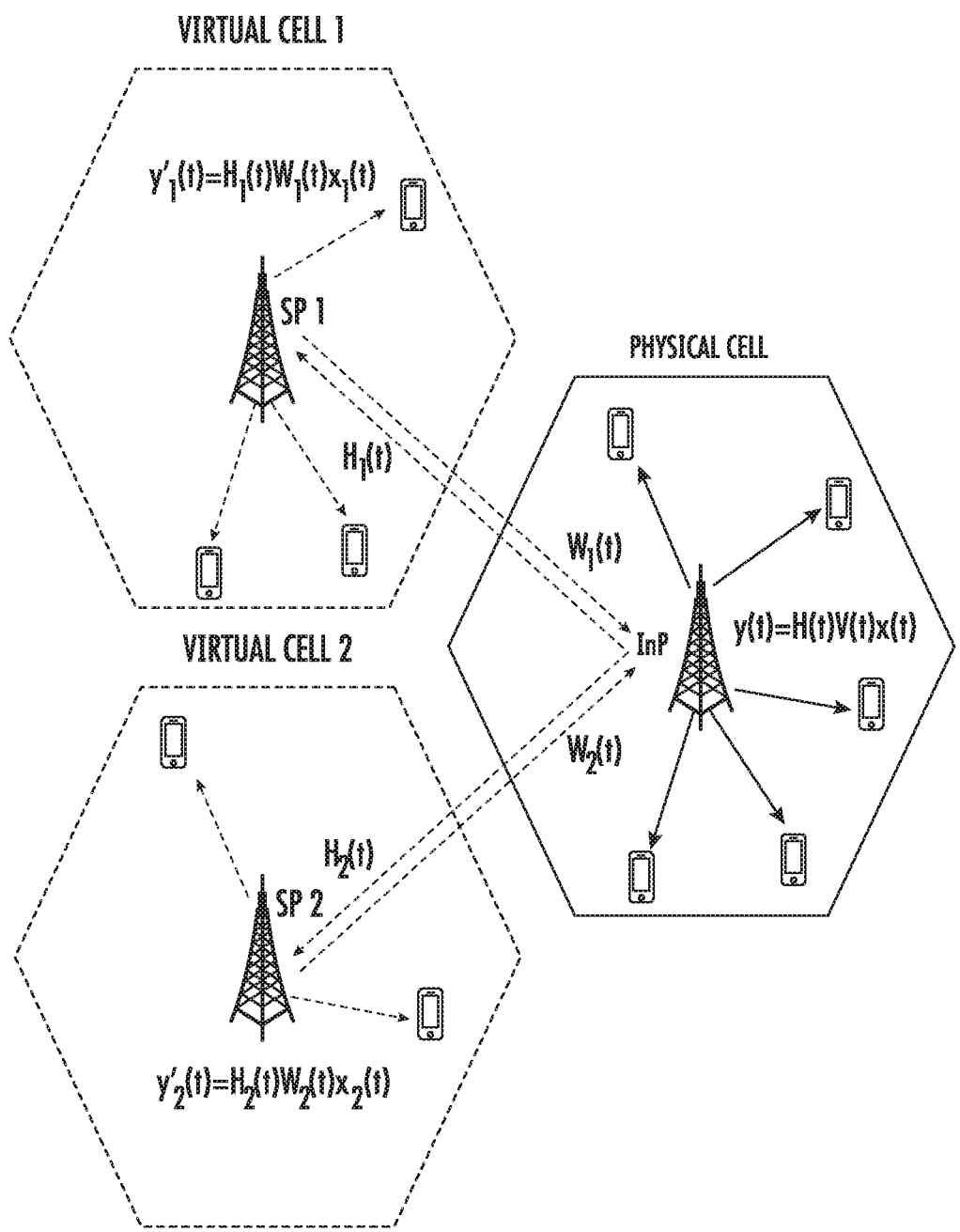
FIG. 8 depicts scheduling and precoding of a virtualized MIMO wireless network.

The scheduling and precoding of a virtualized MIMO wireless network are shown in FIG. 8. Let $H_m(t) \in \mathbb{C}^{K_m \times N}$ denote the channel matrix between SP m (network node 16) and its serving users $\mathcal{K}_m$, $m \in \mathcal{M}$. At each time slot $t \geq 0$, the InP shares $H_m(t)$ with SP $m \in \mathcal{M}$. Using $H_m(t)$, each SP m designs its own precoding matrix $W_m(t) \in \mathbb{C}^{N \times K_m}$, $\forall m \in \mathcal{M}$ and sends it to the InP as a virtual precoding matrix. For SP m, with precoding matrix $W_m(t)$, the virtual received signal vector (of $K_m$ users) $y_m'(t) \in \mathbb{C}^{K_m}$ is $$y_m'(t) = H_m(t) W_m(t) x_m(t) + z_m(t)$$

where $x_m(t) \in \mathbb{C}^{K_m}$ is the transmitted signal vector, and $z_m(t) \in \mathbb{C}^{K_m}$ is the receiver additive noise vector. Defining $y'(t) \triangleq [y_1'^H(t), \ldots, y_M'^H(t)]^H \in \mathbb{C}^K$, the virtual received signal vector of all K users, results in the following:

$$y'(t) = D(t) x(t) + z(t)$$

where $D(t) \in \mathbb{C}^{K \times K}$ can be viewed as the virtualization demand defined by $$D(t) \triangleq \text{diag}\{H_1(t) W_1(t), \ldots, H_M(t) W_M(t)\}$$

where $x(t) \triangleq [x_1^H(t), \ldots, x_M^H(t)]^H \in \mathbb{C}^K$ is the transmitted signal vector to all K users, and $z(t) \triangleq [z_1^H(t), \ldots, z_M^H(t)]^H \in \mathbb{C}^K$ is the receiver additive noise vector.

At each time slot $t \geq 0$, the InP designs the actual downlink precoding matrix $V(t) \triangleq [V_1(t), \ldots, V_M(t)] \in \mathbb{C}^{N \times K}$ where $V_m(t) \in \mathbb{C}^{N \times K_m}$ is the actual downlink precoding matrix for SP $m \in \mathcal{M}$. The actual received signal vector $y_m(t) \in \mathbb{C}^{K_m}$ by the $K_m$ users of SP m is $$y_m(t) = H_m(t) V_m(t) x_m(t) + \sum_{i \neq m}^{M} H_i(t) V_i(t) x_i(t) + z_m(t)$$

where the second term is the inter-SP interference from other SPs to the users of SP m. The actual received signal vector $y(t) \triangleq [y_1^H(t), \ldots, y_M^H(t)]^H \in \mathbb{C}^K$ off all K users is $$y(t) = H(t) V(t) x(t) + z(t).$$

Assume the transmitted signal vector x(t) at each time slot $t \geq 0$ is zero-mean, uncorrelated with unit power, i.e., $\mathbb{E}\{x(t)\} = 0$ and $\mathbb{E}\{x(t) x^H(t)\} = I_K$. The expected deviation of received signal vectors between SPs' virtual precoding and the InP's actual precoding is $$\mathbb{E}\{\|y(t) - y'(t)\|_F^2\} = \mathbb{E}_H\{\|H(t) V(t) - D(t)\|_F^2\}.$$

Note that each SP m designs its own virtual precoding matrix $W_m(t)$ without considering the inter-SP interference, while the InP designs the actual downlink precoding matrix V(t) to mitigate the inter-SP interference in order to meet the virtualization demand D(t) from the SPs.

Problem Formulation

As mentioned above, the InP performs downlink WNV by optimizing MIMO precoding to minimize the expected deviation of received signals at users, subject to both long-term and short-term network node power constraints. The formulated optimization problem is given by

P1

$$\min_{\{V(L)\}} \lim_{T \to \infty} \frac{1}{T} \sum_{t=0}^{T-1} \mathbb{E}\{\|H(t)V(t) - D(t)\|_F^2\} \quad (2)$$

$$\text{s.t.} \lim_{T \to \infty} \frac{1}{T} \sum_{t=0}^{T-1} \mathbb{E}\{\|V(t)\|_F^2\} \leq \bar{P}, \quad (3)$$

$$\|V(t)\|_F^2 \leq P_{max} \quad (4)$$

where $\bar{P}$ is the average power limit and $P_{max}$ is the maximum network node power, both set by the InP, and $\bar{P} \leq P_{max}$ is assumed to avoid triviality. Note that V(t) is a function of H(t), which is random. P1 is a stochastic optimization problem that is challenging to solve, especially when the CDI is unknown.

Inaccurate CSI: Besides unknown CDI, also consider a scenario where the CSI available to the InP is inaccurate. Specifically, the InP only has the estimated CSI $\hat{H}(t)$ at each time slot $t \geq 0$. Assume the normalized channel estimation error is bounded by $\delta \in [0, 1]$, given by $$\frac{\|H_m(t) - \hat{H}_m(t)\|_F}{\|H_m(t)\|_F} \leq \delta, \forall m \in \mathcal{M}, \forall t \geq 0. \quad (5)$$

In this case, each SP m only has the estimated CSI $\hat{H}_m(t)$ from the InP to design its virtual precoding matrix, which is denoted by $\hat{W}_m(t)$ at each time slot $t \geq 0$. As a result, only the inaccurate version of virtualization demand $\hat{D}(t) \triangleq \text{diag}\{\hat{H}_1(t) \hat{W}_1(t), \ldots, \hat{H}_M(t) \hat{W}_M(t)\}$ is available for the InP to design the precoding matrix denoted by $\hat{V}(t)$. With the unknown CDI and only inaccurate CSI $\hat{H}(t)$, P1 is even more challenging to solve.

Note that P1 can be viewed as a stochastic optimization problem over time, where H(t) is the unknown system state and the precoding matrix V(t) is the control action at time slot t. This is similar to the stochastic optimization of a system with observed system state over time, such that the long time average expected cost objective is minimized, while both the short-term and long-term average expected constraints are satisfied.

With the above problem formulation, an online MIMO WNV algorithm is developed under unknown CDI and inaccurate CSI to find a solution for P1. The general Lyapunov optimization approach is employed for the online algorithm design. However, different from the standard DPP technique for Lyapunov optimization based on perfect system state, techniques are developed to design the algorithm based on inaccurate system state information, which will be shown to provide deterministic performance bounds. Furthermore, the algorithm is shown to provide much stronger sample path and convergence time guarantees than the guarantees associated with the standard Lyapunov optimization technique.

Remark 1. Note that although an i.i.d. channel state H(t) over time is assumed, the algorithm and analysis can be extended to the Markovian channel as well.

Online MIMO WNV

Online MIMO WNV Algorithm

Consider that only inaccurate CSI $\hat{H}(t)$ is available at each time slot $t \geq 0$, and define the deviation of received signals at users under inaccurate CSI as $\hat{\rho}(t) \triangleq \|\hat{H}(t)\hat{V}(t) - \hat{D}(t)\|_F^2$. Following the general Lyapunov optimization technique, introduce a virtual queue $Z(t)$ for constraint (3) with update rule $$Z(t+1) = \max\{Z(t) + \|\hat{V}(t)\|_F^2 - \bar{P}, 0\}, \forall t \geq 0. \tag{6}$$

Further define $L(t) \triangleq Z^2(t)$ as the quadratic Lyapunov function, and $\Delta(t) \triangleq L(t+1) - L(t)$ as the corresponding Lyapunov drift for all time slots $t \geq 0$. In the Lyapunov optimization framework, instead of minimizing the objective in P1 directly, in some embodiments, the virtual queue is stabilized while minimizing the deviation of received signals of users under inaccurate CSI through minimizing a DPP metric $\mathbb{E}\{\Delta(t)|Z(t)\} + U\mathbb{E}\{\hat{\rho}(t)|Z(t)\}$. This metric is a weighted sum of the conditional expectation over the virtual queue $Z(t)$ of the per-slot Lyapunov drift $\Delta(t)$ and deviation $\hat{\rho}(t)$ of received signals at users under inaccurate CSI, with $U > 0$ being the weight. First, an upper bound of the DPP metric is provided in the following Lemma.

Lemma 1. Under any precoding design algorithm, the DPP metric has the following upper bound for all $Z(t)$ and $U > 0$:

$$\mathbb{E}\{\Delta(t)|Z(t)\} + U\mathbb{E}\{\hat{\rho}(t)|Z(t)\} \leq S + U\mathbb{E}\{\hat{\rho}(t)|Z(t)\} + Z(t)\mathbb{E}\{\|\hat{V}(t)\|_F^2 - \bar{P}|Z(t)\} \tag{7}$$

where $S \triangleq \frac{1}{2}\max\{(P_{max} - \bar{P})^2, \bar{P}^2\}$.

Minimizing the drift plus penalty (DPP) metric directly is still difficult due to the dynamics involved in $\Delta(t)$. Instead, the above upper bound is minimized. To be specific, given $\hat{H}(t)$ at each time slot $t \geq 0$, taking the per-slot version of the upper bound in (7) by removing the expectation and constant S, the following per-slot optimization problem is obtained:

$$P2: \min_{\hat{V}(t)} U\|\hat{H}(t)\hat{V}(t) - \hat{D}(t)\|_F^2 + Z(t)\|\hat{V}(t)\|_F^2 \tag{8}$$

$$\text{s.t.} \|\hat{V}(t)\|_F^2 \leq P_{max}. \tag{9}$$

Figure 9:
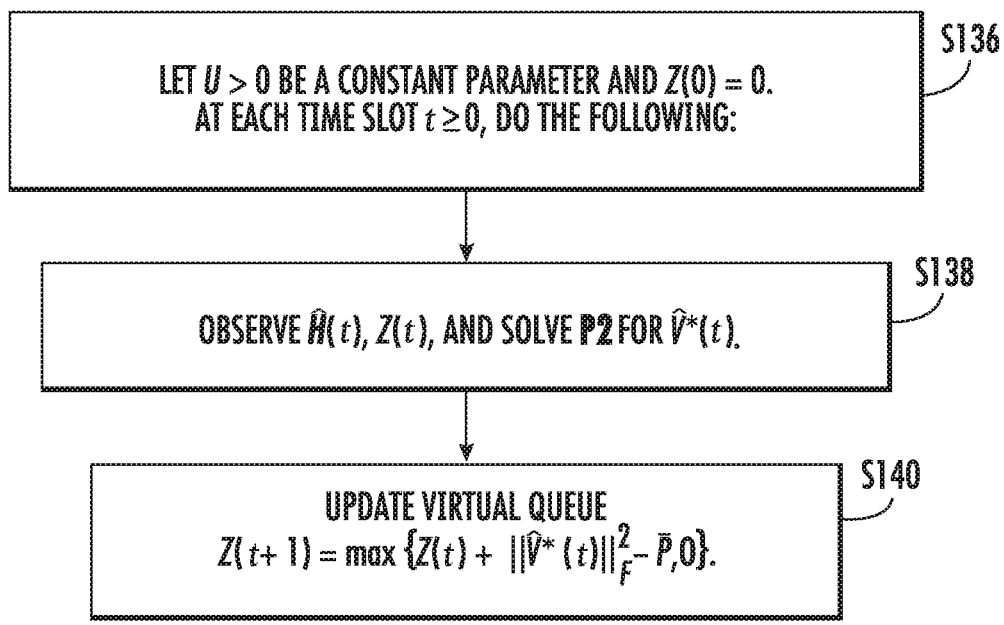
FIG. 9 is a flowchart of an exemplary online MIMO VNW algorithm that works under unknown CDI and inaccurate CSI.

FIG. 9 provides a flowchart of an exemplary online MIMO VNW process that works under unknown CDI and inaccurate CSI. The process includes letting U being a constant parameter greater than zero and letting $Z(0) = 0$ (Block S136). The process also includes observing $\hat{H}(t)$ and $Z(t)$ and solving for P2 for $\hat{V}^*(t)$ (Block S138). The process also includes updating the virtual queue according to $$Z(t+1) = \max\{Z(t) + \|\hat{V}(t)\|_F^2 - \bar{P}, 0\}$$

(Block S140).

Online Precoding Solution

The per-slot optimization problem P2 is a convex optimization problem. Slater's condition holds for P2, since it is easy to show that $\hat{V}(t) = 0$ is a feasible solution, and thus strong duality holds. Define the Lagrange function with Lagrange multiplier $\lambda$ for P2 as $$L(\hat{V}(t), \lambda) = U\|\hat{H}(t)\hat{V}(t) - \hat{D}(t)\|_F^2 + Z(t)\|\hat{V}(t)\|_F^2 + \lambda(\|\hat{V}(t)\|_F^2 - P_{max})$$

Taking the derivative with respect to $\hat{V}^*(t)$ (the complex conjugate of $\hat{V}(t)$) and setting it to 0, yields:

$$\partial_{\hat{V}^*(t)} L(\hat{V}(t), \lambda) = U(\hat{H}^H(t)\hat{H}(t)\hat{V}(t) - \hat{H}^H(t)\hat{D}(t)) + (Z(t) + \lambda)\hat{V}(t) = 0.$$

Let $\hat{V}^*(t)$ be an optimal solution to P2. Since strong duality holds for P2, the Karush Kuhn Tucker (KKT) conditions for global optimality are:

$$\left(\hat{H}^H(t)\hat{H}(t) + \frac{Z(t) + \lambda^*}{U}I\right)\hat{V}^*(t) = \hat{H}^H(t)\hat{D}(t), \tag{10}$$

$$\|\hat{V}^*(t)\|_F^2 - P_{max} \leq 0, \tag{11}$$

$$\lambda^* \geq 0, \tag{12}$$

$$\lambda^*\left(\|\hat{V}^*(t)\|_F^2 - P_{max}\right) = 0. \tag{13}$$

First, consider $Z(t) + \lambda^* > 0$, so that $$\hat{V}^*(t) = \left(\hat{H}^H(t)\hat{H}(t) + \frac{Z(t) + \lambda^*}{U}I\right)^{-1}\hat{H}^H(t)\hat{D}(t) \tag{14}$$

which follows from (10) since $$\hat{H}^H(t)\hat{H}(t) + \frac{Z(t) + \lambda^*}{U}I \in \mathbb{S}_{++}.$$

From the complementary slackness condition (13), if (11) is satisfied by (14) with $\lambda^* = 0$, it is used as the precoding design. Otherwise, find $\lambda^* > 0$ such that $\|\hat{V}^*(t)\|_F^2 = P_{max}$. Then, consider $Z(t) = \lambda^* = 0$, from (10). The optimal solution may satisfy:

$$\hat{H}^H(t)\hat{H}(t)\hat{V}^*(t) = \hat{H}^H(t)\hat{D}(t). \tag{15}$$

Since $\hat{H}(t) \in \mathbb{C}^{K \times N}$ and assuming $K \leq N$, there are two cases depending on K and N. First, if $K < N$, equation (15) is an under-determined equation system for $\hat{V}^*(t)$ with infinitely many solutions. The under-determined least square problem that minimizes $\|\hat{V}^*(t)\|_F^2$ subject to (15) has a closed form solution as:

$$\hat{V}^*(t) = \hat{H}^H(t)(\hat{H}(t)\hat{H}^H(t))^{-1}\hat{D}(t). \tag{16}$$

Then, if (11) is satisfied by (16), then (11) is used as the precoding design. Otherwise, $\hat{V}^*(t)$ is of the form (14) and then find $\lambda^* > 0$ such that $\|\hat{V}^*(t)\|_F^2 = P_{max}$. Second, if $K = N$, $\hat{H}^H(t)\hat{H}(t)$ is of full rank with probability 1 and thus (15) has a unique solution $$\hat{V}^*(t) = (\hat{H}^H(t)\hat{H}(t))^{-1}\hat{H}^H(t)\hat{D}(t). \tag{17}$$

Then, if (11) is satisfied by (17), then (11) is used as the precoding design. Otherwise, $\hat{V}^*(t)$ is of the form (14) and then find $\lambda^* > 0$ such that $\|\hat{V}^*(t)\|_F^2 = P_{max}$.

Remark 2. Assume that the users and network node 16 antennas are independent, such that the random channel matrix $H(t) \in \mathbb{C}^{K \times N}$ is of full rank with probability 1 at each time slot $t \geq 0$.

Figure 10:
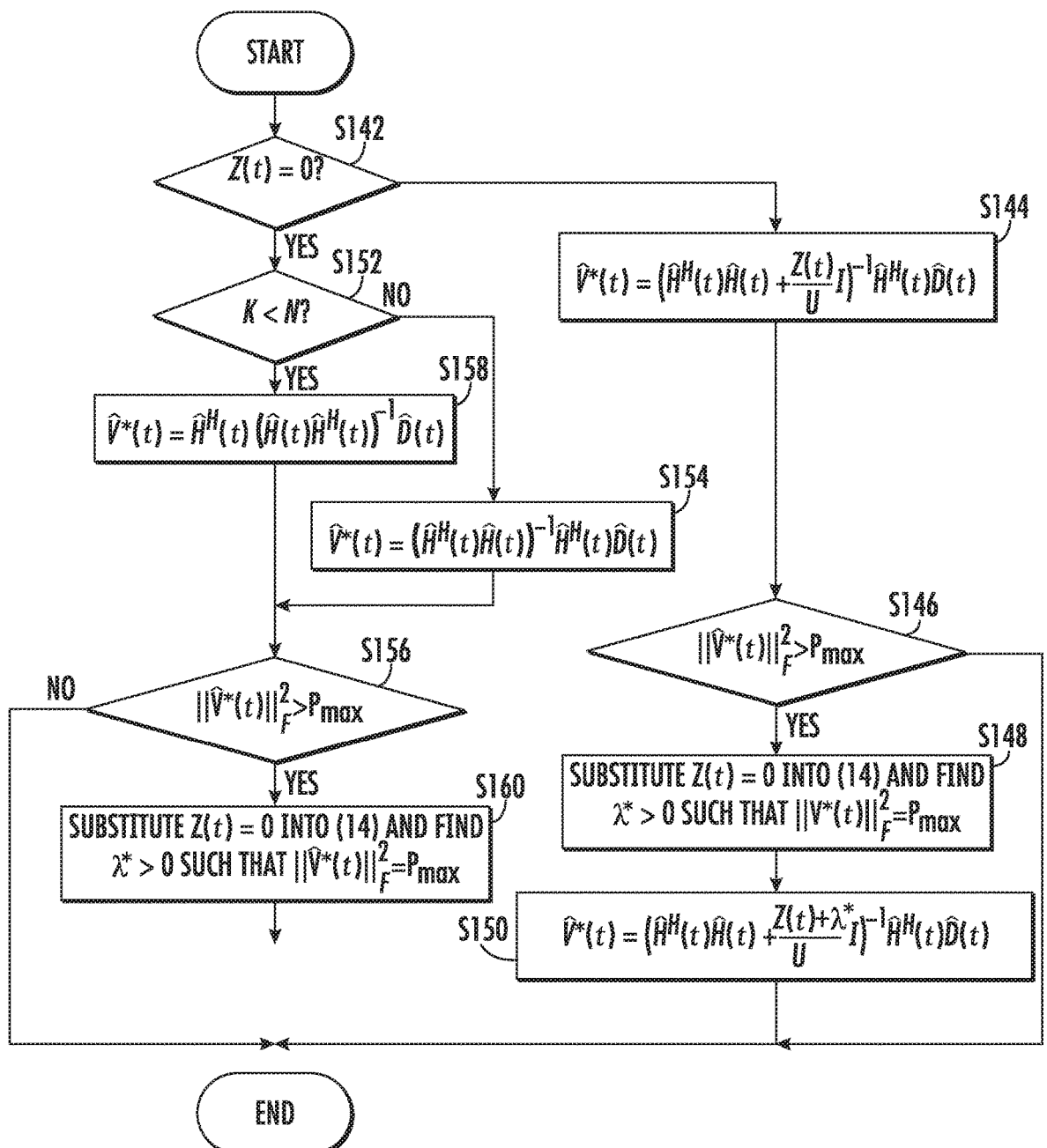
FIG. 10 is a flowchart of an exemplary online precoding solution to the per-slot optimization problem P2.

FIG. 10 provides the flowchart of an exemplary online precoding solution to the per-slot optimization problem P2. The process starts at Block S142, it is determined if $Z(t) = 0$. If not, the process continues at Block S144 where the following is computed:

$$\hat{V}^*(t) = \left(\hat{H}^H(t)\hat{H}(t) + \frac{Z(t)}{U}I\right)^{-1}\hat{H}^H(t)\hat{D}(t).$$

Then, when $\|\hat{V}^*(t)\|_F^2 > P_{max}$ (Block S146). If not, the process ends. If $\|\hat{V}^*(t)\|_F^2 > P_{max}$, then the process continues at Block S148, where $Z(t) > 0$ is substituted into (14) and $\lambda^* > 0$ is found such that $\|\hat{V}^*(t)\|_F^2 = P_{max}$. Then the following is computed and the process ends:

$$\hat{V}^*(t) = \left(\hat{H}^H(t)\hat{H}(t) + \frac{Z(t) + \lambda^*}{U}I\right)^{-1}\hat{H}^H(t)\hat{D}(t)$$

(Block S150). Returning to Block S142, if $Z(t)=0$, then it is determined whether K<N (Block S152). If not, the process continues to Block S154, where the following is computed:

$$\hat{V}^*(t) = (\hat{H}^H(t)\hat{H}(t))^{-1}\hat{H}^H(t)\hat{D}(t),$$

and the process continues to Block S156. If K<N, then the following is computed:

$$\hat{V}^*(t) = \hat{H}^H(t)(\hat{H}(t)\hat{H}^H(t))^{-1}\hat{D}(t),$$

(Block S158). The process continues to Block S156, where it is determined whether $\|\hat{V}^*(t)\|_F^2 > P_{max}$. If not, the process ends. Otherwise, $Z(t)>0$ is substituted into (14) and $\lambda^*>0$ is found such that $\|\hat{V}^*(t)\|_F^2 = P_{max}$ (Block S160). Then, the process ends.

Performance Analysis

Consider two common precoding schemes adopted by the SPs, matched filtering (MF) and zero forcing (ZF), and analyze the performance of the online MIMO WNV algorithm under both accurate and inaccurate CSI.

Virtual Precoding by the SPs

Assume SP $m \in \mathcal{M}$ designs its virtual precoding matrix $\hat{W}_m$ either adopting the matched filtering (MF) precoding scheme to maximize the signal to noise ratio (SNR), or the zero forcing (ZF) precoding scheme to null the multi-user interference.

MF Precoding

Denote M' the number of SPs that adopt the MF precoding scheme and let $\mathcal{M}' = \{1, \ldots, M'\}$. Suppose SP $m' \in \mathcal{M}'$ adopts the MF precoding scheme at each time slot $t \geq 0$ as $$\hat{W}_{m'}^{MF}(t) = \hat{\alpha}_{m'}^{MF}(t)\hat{H}_m^H(t) \quad (18)$$

where $\hat{\alpha}_{m'}^{MF}(t)$ is the power normalizing factor, $$\hat{\alpha}_{m'}^{MF}(t) = \sqrt{\frac{P_{m'}}{\|\hat{H}_{m'}(t)\|_F^2}}$$

such that SP m' requests $P_{m'}$ network node power $$\|\hat{W}_{m'}^{MF}(t)\|_F^2 = P_{m'}.$$

ZF Precoding

Suppose SP $m \in \mathcal{M} \setminus \mathcal{M}'$ adopts the ZF precoding scheme to null the inter-user interference at each time slot $t \geq 0$ as $$\hat{W}_m^{ZF}(t) = \hat{\alpha}_m^{ZF}(t)\hat{H}_m^H(t)(\hat{H}_m(t)\hat{H}_m^H(t))^{-1} \quad (19)$$

where $\hat{\alpha}_m^{ZF}(t)$ is the power normalizing factor:

$$\hat{\alpha}_m^{ZF}(t) = \sqrt{\frac{P_m}{tr\{(\hat{H}_m(t)\hat{H}_m^H(t))^{-1}\}}}$$

such that SP m requests $P_m$ network node power $$\|\hat{W}_m^{ZF}(t)\|_F^2 = P_m.$$

Performance Bounds Under Accurate CSI

Consider the case of accurate CSI, such that $\hat{H}(t)=H(t)$, $\forall t \geq 0$, and note that equation (1) is assumed. Deterministic performance bounds achieved by the algorithm under accurate CSI are derived. Then, the following lemma that provides a deterministic upper bound of the virtual queue Z(t) holds.

Lemma 2. Under accurate CSI, the virtual queue Z(t) obtained by the algorithm at each time slot $t \geq 0$ is upper bounded by $$Z(t) \leq UB^2\xi + P_{max} - \overline{P}$$

where $\xi \triangleq \sqrt{\frac{N(K_{min}\sum_{m'=1}^{M'}P_{m'} + \sum_{m=1}^{M-M'}P_m)}{K_{min}\overline{P}}},$ and $K_{min} \triangleq \min\{K_m : \forall m \in \mathcal{M}\}$.

Denote $\{V^{opt}(t)\}$ as the optimal solution to P1, which depends on the unknown CDI of H(t), and define $\rho^{opt}$ in the optimum of P1 given in (2). The following theorem summarizes the deterministic performance bounds of the algorithm under accurate CSI.

Theorem 3. For given $\epsilon > 0$, set parameter $$U = \frac{S}{\epsilon},$$

where constant S is defined below (7). For $V^*(t)$ produced by the algorithm under accurate CSI, the following bounds hold for any $T \geq 1$, regardless of the distribution of H(t)

$$\frac{1}{T}\sum_{t=0}^{T-1} \mathbb{E}\{\rho(H(t), V^*(t), D(t))\} \leq \rho^{opt} + \epsilon,$$

$$\frac{1}{T}\sum_{t=0}^{T-1} \|V^*(t)\|_F^2 \leq \overline{P} + \frac{SB^2\xi + \epsilon(P_{max} - \overline{P})}{\epsilon T}.$$

Remark 3. Theorem 3 states that the performance achieved by the algorithm under accurate CSI without CDI can be arbitrarily close to the performance achieved by the optimal solution to P1 with the knowledge of CDI, since $\epsilon$ is a controllable constant that can be set arbitrarily small. Note that the standard DPP technique only ensures $$\lim_{T \to \infty} \frac{1}{T}\sum_{t=0}^{T-1} \|V^*(t)\|_F^2 \leq \overline{P}.$$

Theorem 3 provides a much stronger sample path guarantee on the average network node power than the guarantee ensured by standard DPP technique. Furthermore, Theorem 3 also provides an $$O\left(\frac{1}{\epsilon^2}\right)$$

convergence time guarantee to reach an $\epsilon$-approximate solution.

Performance Bounds Under Inaccurate CSI

Consider the case of inaccurate CSI, such that the true CSI H(t) is unknown but bounded as in (1), and only inaccurate CSI Ĥ(t) is available with the channel inaccuracy bounded as in (5) at each time slot t≥0. The deterministic performance bounds achieved by the algorithm under inaccurate CSI in this subsection are derived. The analysis in this subsection extends the standard DPP technique based on accurate system state information to inaccurate system state information, which requires new deterministic upper bounds of the virtual queue Z(t) and the DPP metric. The following lemma gives a new deterministic upper bound of the virtual queue Z(t) under inaccurate CSI.

Lemma 4. Under inaccurate CSI, Z(t) obtained by the algorithm at each time slot t≥0 is bounded by $$Z(t) \leq UB^2(1+\delta)^2\xi + P_{max} - \overline{P}.$$

Let $\hat{H}_m(t)\hat{H}_m^H(t) = \hat{Q}_m(t)\hat{\Omega}_m(t)\hat{Q}_m^H(t)$ be the eigenvalue decomposition of $\hat{H}_m(t)\hat{H}_m^H(t)$, where $\hat{Q}_m(t) \in \triangleq \mathbb{C}^{K_m \times K_m}$ is a unitary matrix and $\hat{\Omega}_m(t) = \text{diag}\{\hat{\omega}_{m,1}(t), \ldots, \hat{\omega}_{m,K_m}(t)\}, \forall m \in \mathcal{M}, \forall t \geq 0$. Let D(t) and D̂(t) be produced when SP m'∈ $\mathcal{M}'$ adopts the MF precoding scheme in (18), and SP m∈ $\mathcal{M} \setminus \mathcal{M}'$ adopts the ZF precoding scheme in (19) under accurate and inaccurate CSI, respectively. The following lemma provides deterministic upper bounds for $\|D(t)\|_F$ and $\|\hat{D}(t)\|_F$, and a deterministic O(δ) upper bound for $\|D(t) - \hat{D}(t)\|_F$.

Lemma 5. The following bounds hold for all t≥0

$$\|D(t)\|_F \leq \zeta B, \quad (20)$$

$$\|\hat{D}(t)\|_F \leq \zeta B(1+\delta), \quad (21)$$

$$\|D(t) - \hat{D}(t)\|_F \leq \eta B \delta \quad (22)$$

where $$\zeta \triangleq \sqrt{\sum_{m'=1}^{M'} P_{m'} + \sum_{m=1}^{M-M'} P_m},$$

$$\eta \triangleq \sqrt{\frac{5\sum_{m'=1}^{M'} P_{m'}}{1-\delta^2} + \frac{B^8(1+\delta)^4 \sum_{m=1}^{M-M'} P_m}{K_{min}^2 \omega_{min}^2 \hat{\omega}_{min}^2}},$$

$$\omega_{min} = \Delta\min\{\omega_{m,i}(t): \forall i \in K_m, \forall m \in \mathcal{M}, \forall t \geq 0\},$$

$$\hat{\omega}_{min} = \Delta\min\{\hat{\omega}_{m,i}(t): \forall i \in K_m, \forall m \in \mathcal{M}, \forall t \geq 0\}.$$

Define $\emptyset(H(t), V(t), D(t)) \triangleq U\|H(t)V(t) - D(t)\|_F^2 + Z(t)\|V(t)\|_F^2$ and note that $\emptyset(\hat{H}(t), \hat{V}(t), \hat{D}(t))$ is minimized in P2 with optimal solution $\hat{V}^*(t)$ at each time slot t≥0 under the algorithm. The following lemma provides a deterministic O(δ) upper bound of $\emptyset(\hat{H}(t), \hat{V}^*(t), D(t))$ related to $\emptyset(H(t), V^{opt}(t), D(t))$, where $\{V^{opt}(t)\}$ is the optimal solution to P1 with accurate CSI and the knowledge of CDI.

Lemma 6. For $\hat{V}^*(t)$ obtained by the algorithm under inaccurate CSI. For all time, slot t≥0, $\emptyset(H(t), \hat{V}^*(t), D(t))$ is upper bounded as $$\emptyset(H(t),\hat{V}^*(t),D(t)) \leq \emptyset(H(t),V^{opt}(t),D(t)) + U\varphi$$

where $\varphi \triangleq 2[(2+\delta)(P_{max}+\zeta\eta) + 2(\zeta(1+\delta)+\eta)\sqrt{P_{max}}]B^2\delta$, and note that φ=O(δ) in the sense that φ→0 as δ→0.

Leveraging the results of Lemma 6, the following lemma provides a new deterministic performance bound of the DPP metric under inaccurate CSI.

Lemma 7. Let $\hat{V}^*(t)$ be obtained by the algorithm under inaccurate CSI. For all time slots t≥0, the DPP metric is upper-bounded as $$\mathbb{E}_{\{\Delta(t)\}} + U\mathbb{E}_{\{\rho(H(t),\hat{V}^*(t),D(t))\}} \leq U\mathbb{E}_{\{\rho(H(t),V^{opt}(t),D(t))\}} + U\varphi + S.$$

The following theorem summarizes the deterministic performance bounds achieved by the algorithm under inaccurate CSI. The theorem follows from Lemma 7.

Theorem 8. For given ∈>0, set parameter $$U = \frac{S}{\epsilon}.$$

For $\hat{V}^*(t)$ produced by the algorithm under inaccurate CSI, the following bounds hold for any T≥1, regardless of the distribution of H(t)

$$\frac{1}{T}\sum_{t=0}^{T-1} \mathbb{E}\{\rho(H(t), \hat{V}^*(t), D(t))\} \leq \rho^{opt} + \varphi + \epsilon,$$

$$\frac{1}{T}\sum_{t=0}^{T-1} \|\hat{V}^*(t)\|_F^2 \leq \overline{P} + \frac{SB^2(1+\delta)^2\xi + \epsilon(P_{max}-\overline{P})}{\epsilon T}$$

where φ=O(δ).

Remark 4. Theorem 8 states that the performance achieved by the algorithm under inaccurate CSI without CDI can be arbitrarily close to a deterministic O(δ) upper bound of the performance achieved by an optimal solution to P1 with accurate CSI and the knowledge of CDI, since ∈ can be set arbitrarily small. Theorem 8 also provides a strong sample path guarantee and $$O\left(\frac{1}{\epsilon^2}\right)$$

convergence time guarantee to reach an ∈-approximate solution. Note that if δ=0, Theorem 3 is recovered.

Theorem 8 provides an expected O(δ) performance bound yielded by the algorithm under inaccurate CSI. However, Theorem 8 uses an assumption that the virtualization demand is gathered under accurate CSI. Denote $\{\hat{V}^{opt}(t)\}$ as the optimal solution to P1 when virtualization demands D̂(t) are gathered under inaccurate CSI, and $\hat{\rho}^{opt}$ is achieved by the optimal solution. The following theorem provides a deterministic O(δ) performance bound, considering inaccurate virtualization demand.

Theorem 9. For given ∈>0, set parameter $$U = \frac{S}{\epsilon}.$$

For $\hat{V}^*(t)$ produced by the algorithm under inaccurate CSI, the following bound holds for any T≥1, regardless of the distribution of H(t)

$$\frac{1}{T}\sum_{t=0}^{T-1} \mathbb{E}\{\rho(H(t), \hat{V}^*(t), \hat{D}(t))\} \leq \hat{\rho}^{opt} + \hat{\varphi} + \epsilon$$

where $\hat{\varphi} \triangleq 2[(2+\delta)P_{max} + 2\zeta(1+\delta)\sqrt{P_{max}}]B^2 \delta = O(\delta)$.

Numerical Performance Evaluation

Consider an InP that owns a network node 16 with 30 antennas placed at the center of an urban hexagon micro-cell of 500 m radius. The InP serves 4 SPs, each with 2 to 5 single-antenna users uniformly distributed across the cell. Following the typical LTE network settings, the maximum downlink network node power of 16 dBm is set, the maximum uplink power of 10 dBm is set, noise spectral density of −174 dBm/Hz is set, channel bandwidth of 10 kHz is set and a 10 dB noise figure is assumed as default system parameters. An example set of default network parameters are summarized in Table I.

TABLE I

Deault Network Parameters

| Parameter | Value | Parameter | Value |
|---|---|---|---|
| $R_c$ | 500 m | N | 30 |
| $K_m$ | 2-5 | M | 4 |
| BW | 10 kHz | $N_0$ | −174 dBm/Hz |
| NF | 10 dB | $P_{max}$ | 16 dBm |
| $P_{pilot}$ | 10 dBm | L | 1 |

For illustration, the baseband fading channel is modeled that links the network node 16 to user $k \in \mathcal{K}$ as $h_k = \sqrt{\beta_k} g_k$, $\beta_k|_{[dB]} = -31.54 - 10\gamma \log_{10} d_k - \psi_k$ where $\beta_k$ captures path loss and large-scale fading, $\gamma=3.3$ in the range of urban micro-cell (2.7-3.5) is the path loss exponent for the simplified path loss model, $d_k\mathcal{C}$ is the distance from the network node 16 to user k, $\psi_k \sim \mathcal{CN}(0, \sigma_\varnothing^2)$ accounts for the shadowing effect with $\sigma_\varnothing = 8$ dB, and $g_k \sim \mathcal{CN}(0, I_N)$ models the small scale fading.

For the generation of inaccurate CSI, assume that the CSI is obtained through reverse channel estimation in time division duplex (TDD) mode and that the network node 16 estimates the channel through a number of L pilot signals sent one by one with some given power $P_{pilot}$ from the end users. Assume a common minimum mean-square error (MMSE) channel estimation scheme to model the inaccurate CSI $h_k = \hat{h}_k + e_k$, $k \in \mathbb{C}$, where $e_k$ is Gaussian distributed with covariance given by:

$C_{e_k} = C_{h_k} - C_{h_k} T^H (TC_{h_k} T^H + \sigma_n^2 I_{LN})^{-1} TC_{h_k}$ where $C_{h_k} = \mathbb{E}\{h_k h_k^H\}$, $T = \sqrt{P_{pilot}} [I_N^1, \ldots, I_N^L]^H$, and $\sigma_n^2 = N_0 BW + NF$ is the noise power. Define the relative channel estimation error as $$e_H \triangleq \frac{\|H - \hat{H}\|_F}{\|H\|_F}.$$

Remark 5. The online MIMO WNV algorithm works with unknown CDI, and only assumes the channel gain and the channel inaccuracy are bounded in (1) and (5). The use of specific channel and channel estimation models is to validate the algorithm under typical LTE network settings.

Define, as performance metrics, the normalized average downlink message deviation $$\bar{\rho}_{\hat{V}^\star}(T) \triangleq \frac{\frac{1}{T} \sum_{t=0}^{T-1} \|H(t)\hat{V}^\star(t) - D(t)\|_F^2}{\frac{1}{T} \sum_{t=0}^{T-1} \|D(t)\|_F^2}$$

and the average downlink network node power $$\bar{P}_{\hat{V}^\star}(T) \triangleq \frac{1}{T} \sum_{t=0}^{T-1} \|\hat{V}^\star(t)\|_F^2.$$

Assume the channel power is bounded in (1) and set $B = \max\{\|H(t)\|_F : \forall t \geq 0\}$ in simulation studies. For illustration, an equal maximum network node power allocation strategy among the SPs is adopted, i.e., $$P'_m = P_m = \frac{P_{max}}{M}, \forall m' \in$$

$\mathcal{M}'$, $\forall m \in \mathcal{M} \setminus \mathcal{M}'$ in the simulations.

Effect of Parameter U

We evaluate the performance of the algorithm with different weighting factors $$U = \frac{S}{\epsilon}.$$

Theorems 3 and 8 state that the algorithm performance can be arbitrarily close to optimality or with an O(δ) performance bound to optimality, under accurate and inaccurate CSI, respectively. In a simulation study, there is set $\epsilon = \theta B^2 P_{max}$, since $\|D(t)\|_F^2 \leq B^2 P_{max}$, $\forall t \geq 0$ from (20). This allows study of the algorithm performance dependency on U by varying θ instead. Theta is set to 0.1% as a default simulation parameter for the remaining simulations.

Figure 11:
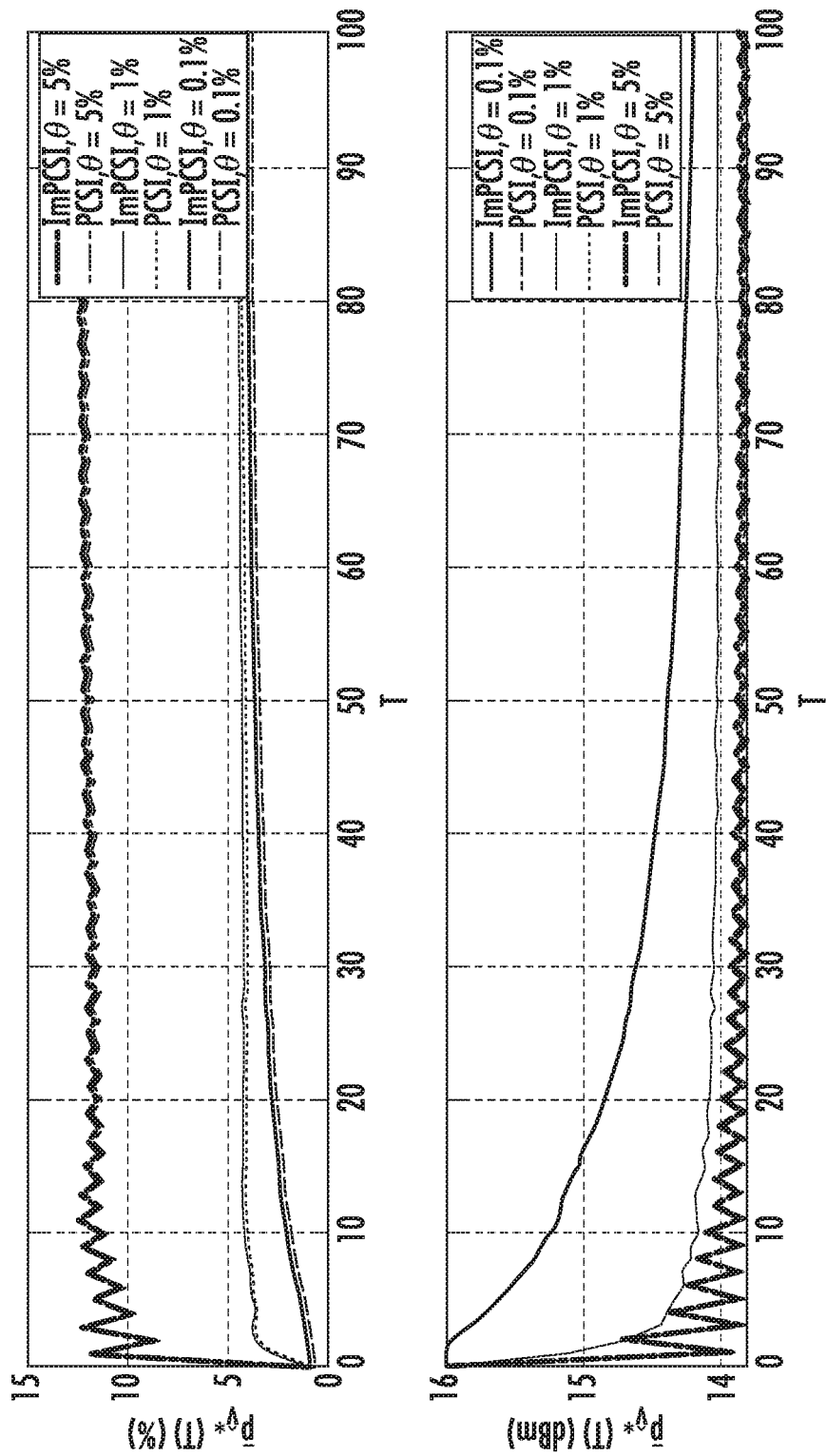
FIGS. 11 and 12 are graphs showing the performance metrics versus θ, when all the SPs adopt MF and ZF precoding, respectively.
Figure 12:
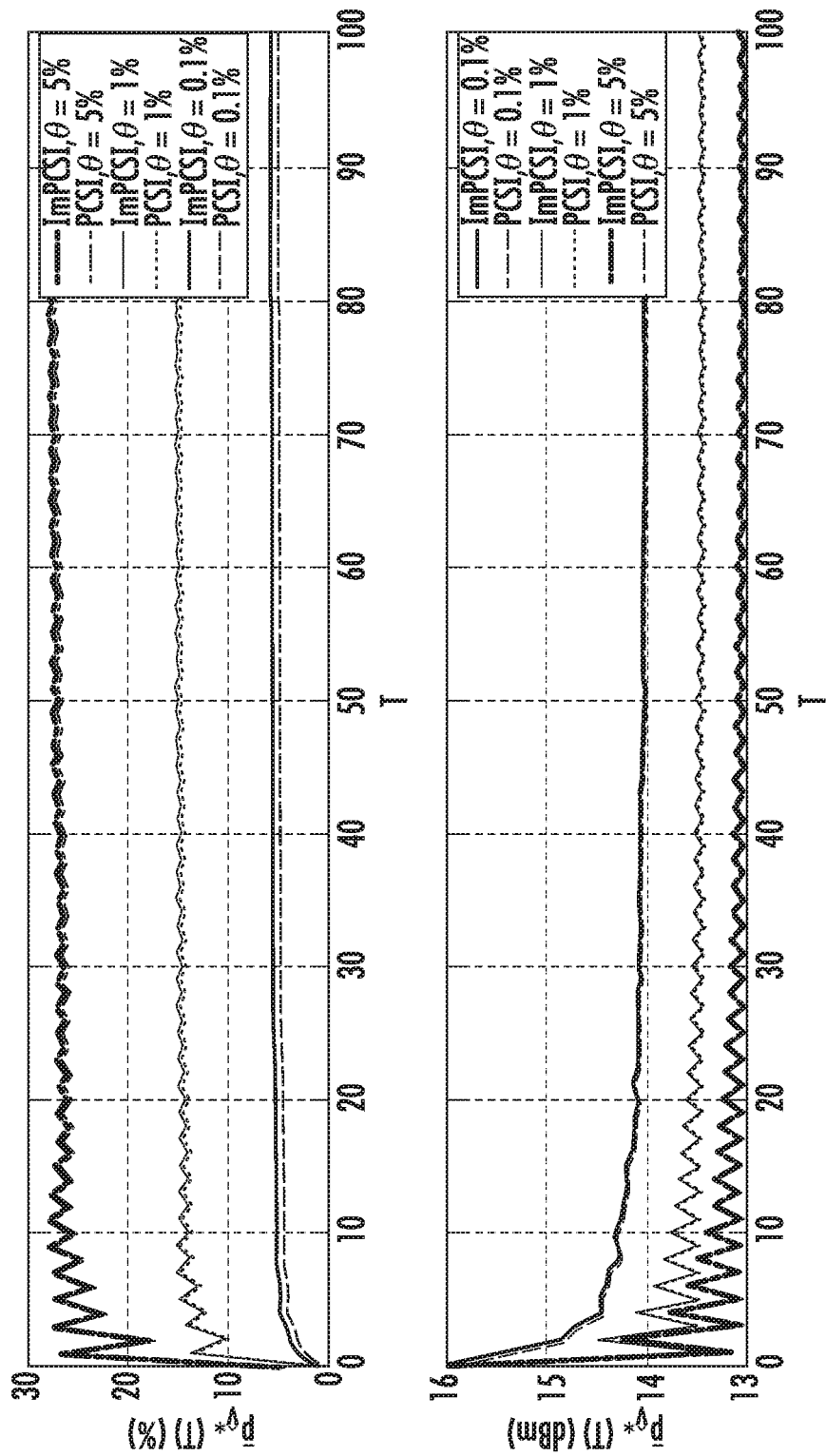
Figure 13:
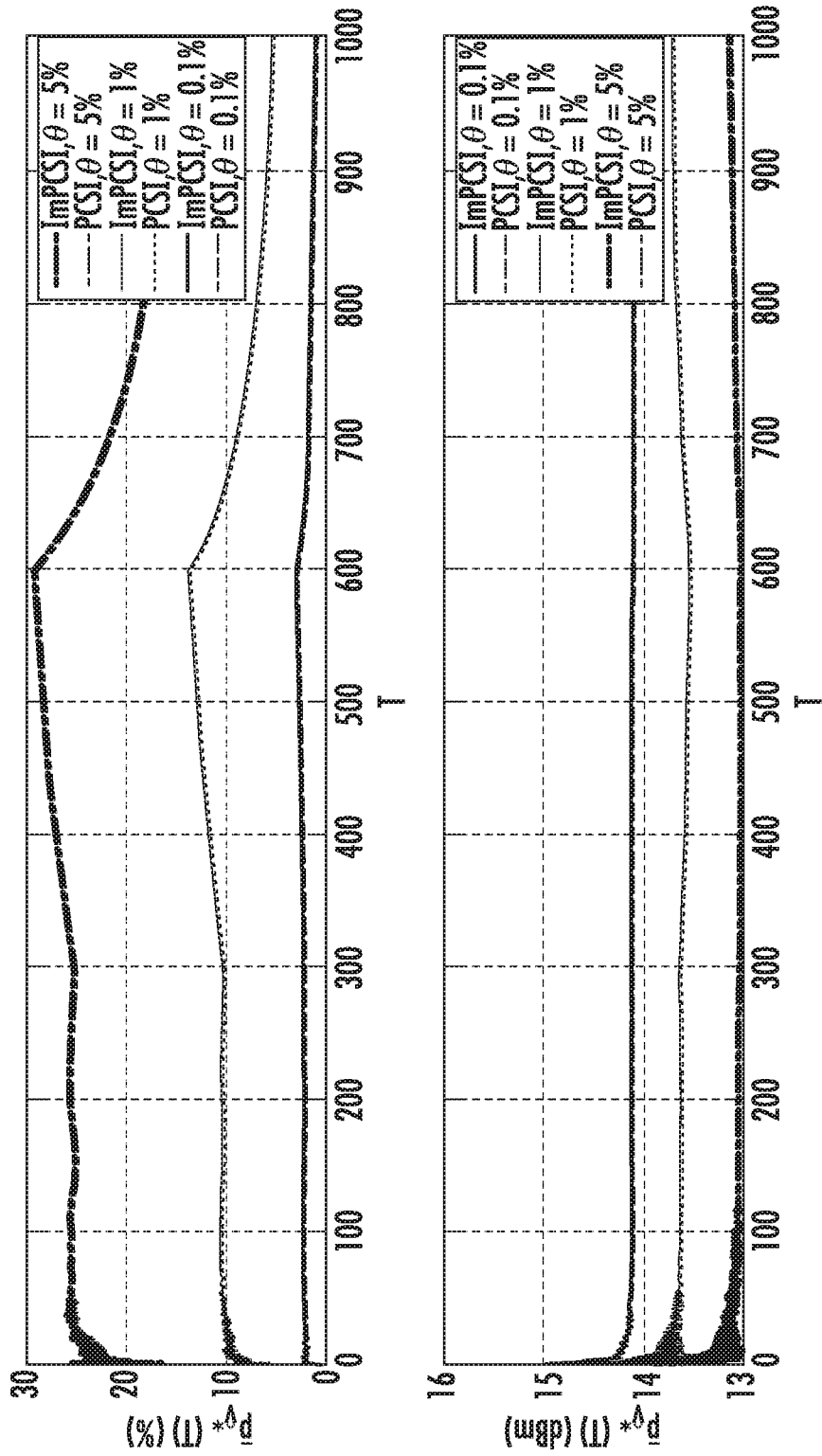
FIG. 13 is a graph showing the algorithm performance under practical scenario that the SPs are free to choose either MF or ZF precoding schemes, and the channel distribution evolves over time

FIGS. 11 and 12 show the performance metrics versus θ, when all the SPs adopt MF and ZF precoding, respectively, with $\bar{P} = 14$ dBm and average channel estimation error $e_H = 6.66\%$. Observe that the algorithm converges fast, even with very small values of θ. More time slots are needed to reach a stable state as θ decreases, since there is greater penalty on the downlink message deviation, making it harder for the algorithm to stabilize the virtual queue, but the performance curves all converge as time slot T increases. Furthermore, as ∈ decreases with θ, the stable value of $\bar{\rho}_{\hat{V}^\star}(T)$ decreases and $\bar{P}_{\hat{V}^\star}(T)$ converges to $\bar{P}$, which is consistent with the results in Theorems 3 and 8. FIG. 13 shows the algorithm performance under the practical scenario that the SPs are free to choose either MF or ZF precoding schemes, and the channel distribution evolves over time. The algorithm is able to trace the channel distribution evolution while limiting the downlink message deviation within 2% (θ=0.1%) and satisfying the long-term network node power constraint.

Figure 14:
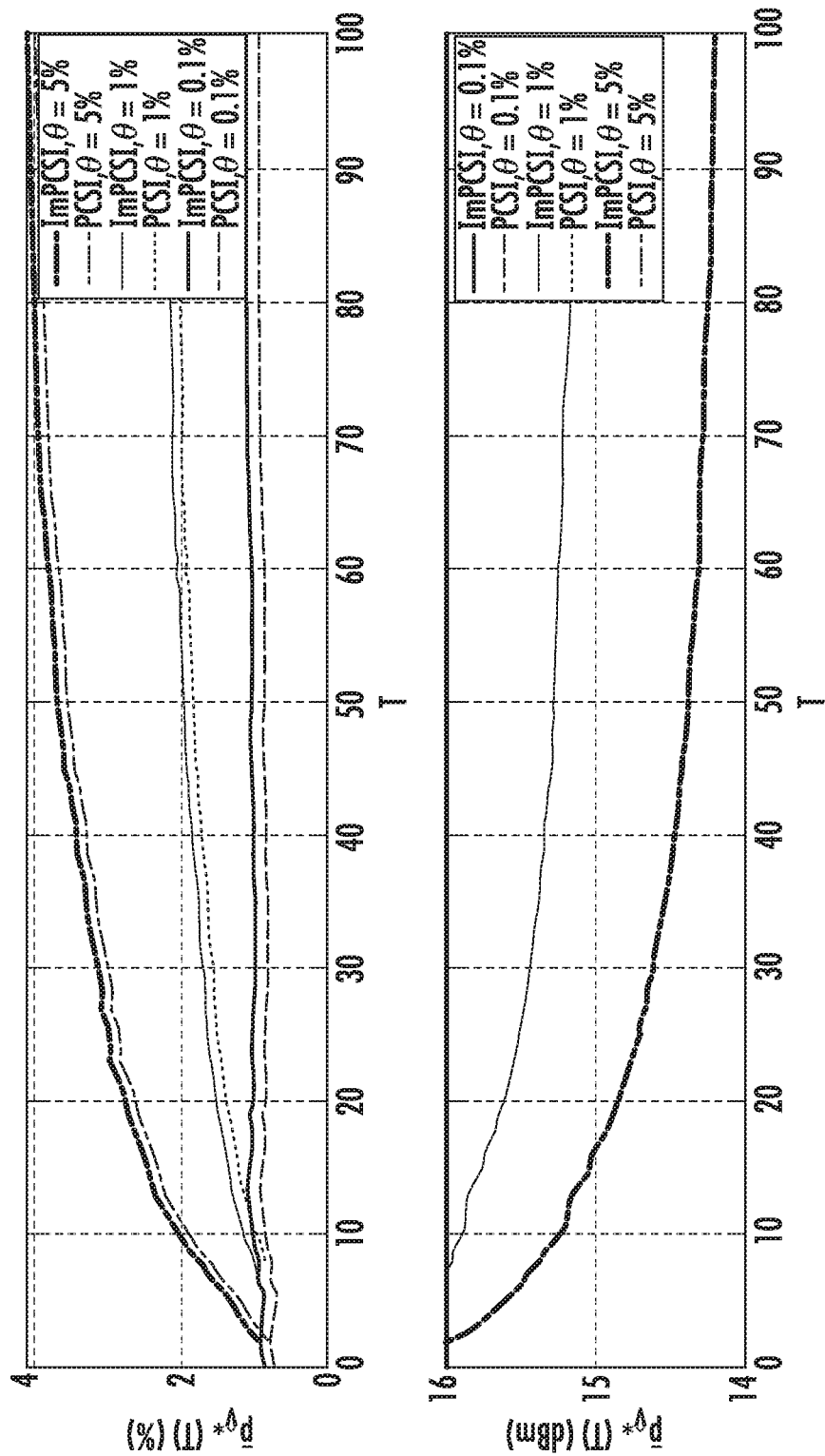
FIGS. 14 and 15 are graphs showing performance of an algorithm for different average power limits $\bar{P}$
Figure 15:
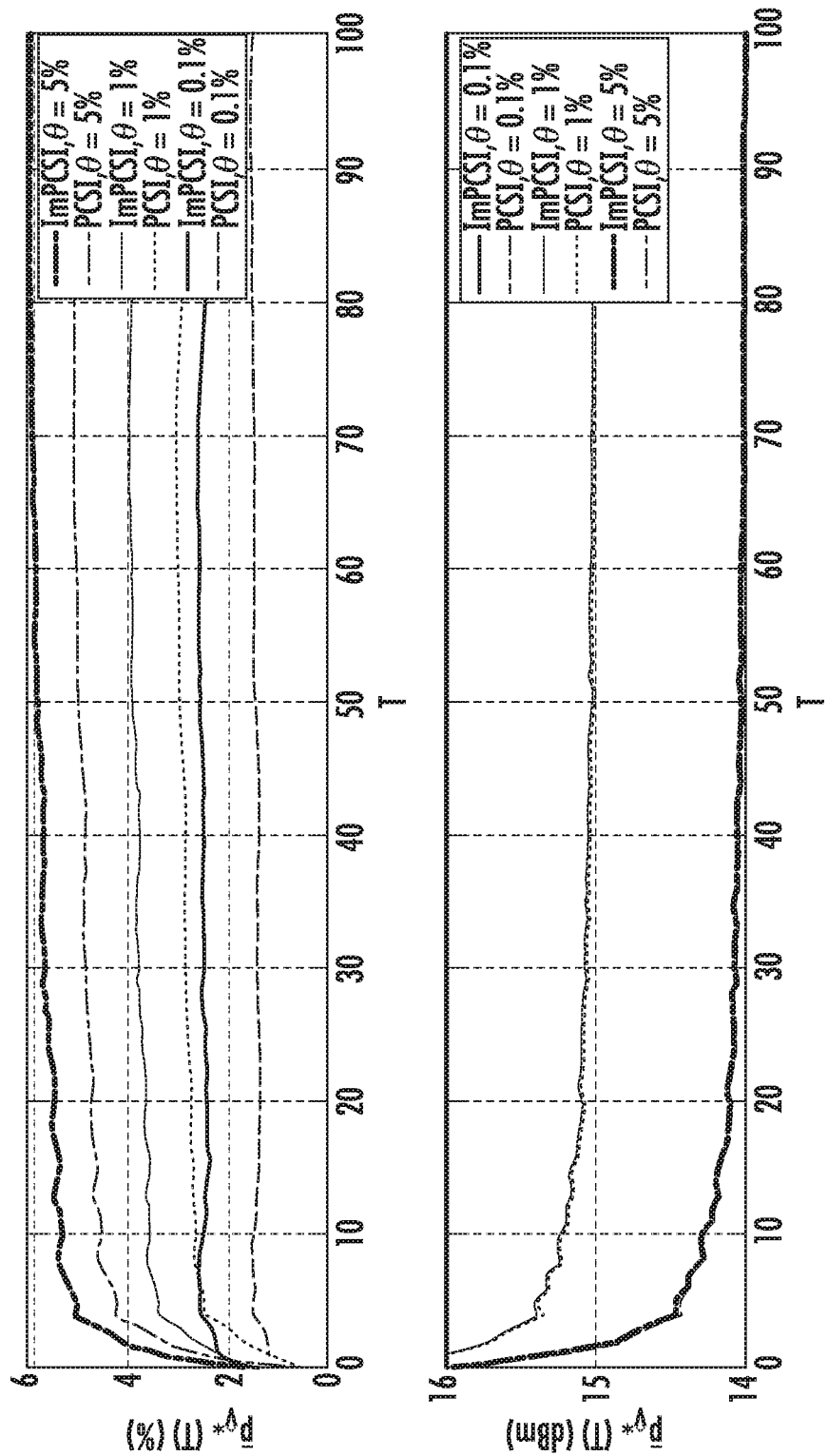

Performance Vs. Average Power Limit $\bar{P}$ performance of an algorithm for different average power limits $\bar{P}$ is evaluated as shown in FIGS. 14 and 15. The stable values of $\bar{\rho}_{\hat{V}^\star}(T)$ are around 1% when $\bar{P} = \infty$, i.e., when the long-term network node power limit is removed, under accurate CSI for both the precoding schemes adopted by the SPs. In addition, the performance gaps between the accurate and inaccurate CSI cases are also small, around 1%. Noting that the SPs request 16 dBm maximum network node power for all time slots, there arises a natural trade-off between $\bar{P}$ and the stable value of $\bar{\rho}_{\hat{V}^\star}(T)$, which allows the InP to balance its power consumption and the service quality provided. Observe that, the stable values of $\bar{\rho}_{\hat{V}^\star}(T)$ are still small (within 6%) even when $\overline{P}$=14 dBm. Furthermore, the stable values of $\overline{P}_{\hat{V}*}(T)$ all converge to different average power limit $\overline{P}$ settings.

Performance Vs. Pilot Signal Power $P_{pilot}$

Figure 16:
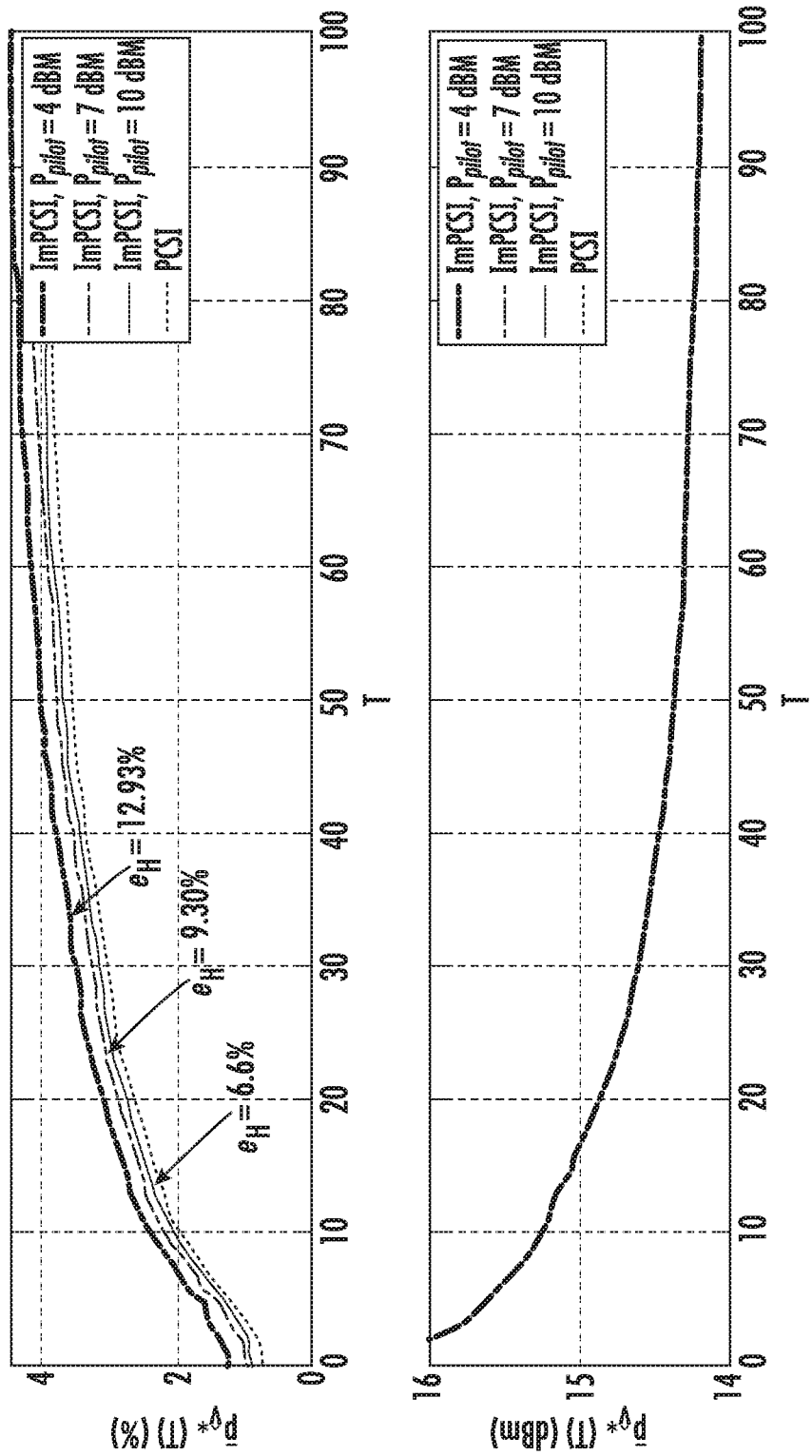
FIGS. 16 and 17 are graphs showing the dependency of an algorithm on the channel inaccuracy by varying the pilot signal power $P_{pilot}$.
Figure 17:
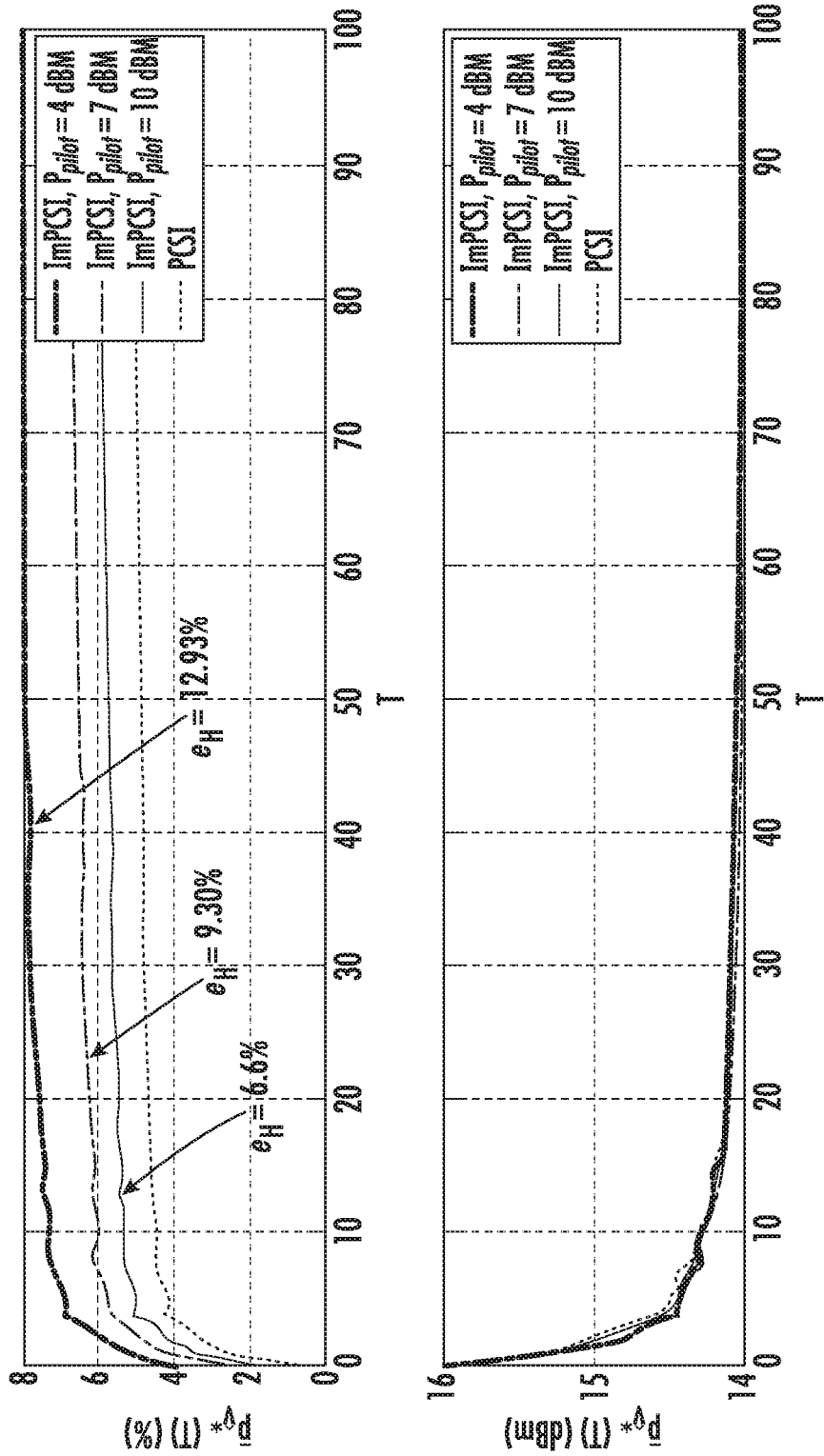

The dependency of the algorithm on channel inaccuracy has been studied by varying the pilot signal power $P_{pilot}$ as shown in FIGS. 16 and 17. Observe that the stable value of $\overline{\rho}_{\hat{V}*}(T)$ increases but are within around a 3% gap to the accurate CSI case, with the channel estimation error increasing from 6.66% to 12.94% as the pilot signal power $P_{pilot}$ decreases from 10 dBm to 4 dBm. In addition, the downlink message deviation is more sensitive to the channel inaccuracy when all SPs adopt ZF precoding compared with the case when all SPs use MF precoding. Furthermore, observe that the impacts of channel inaccuracy on the algorithm convergence and $\overline{P}_{\hat{V}*}(T)$ are negligible.

Performance Vs. Number of Antennas N

Figure 18:
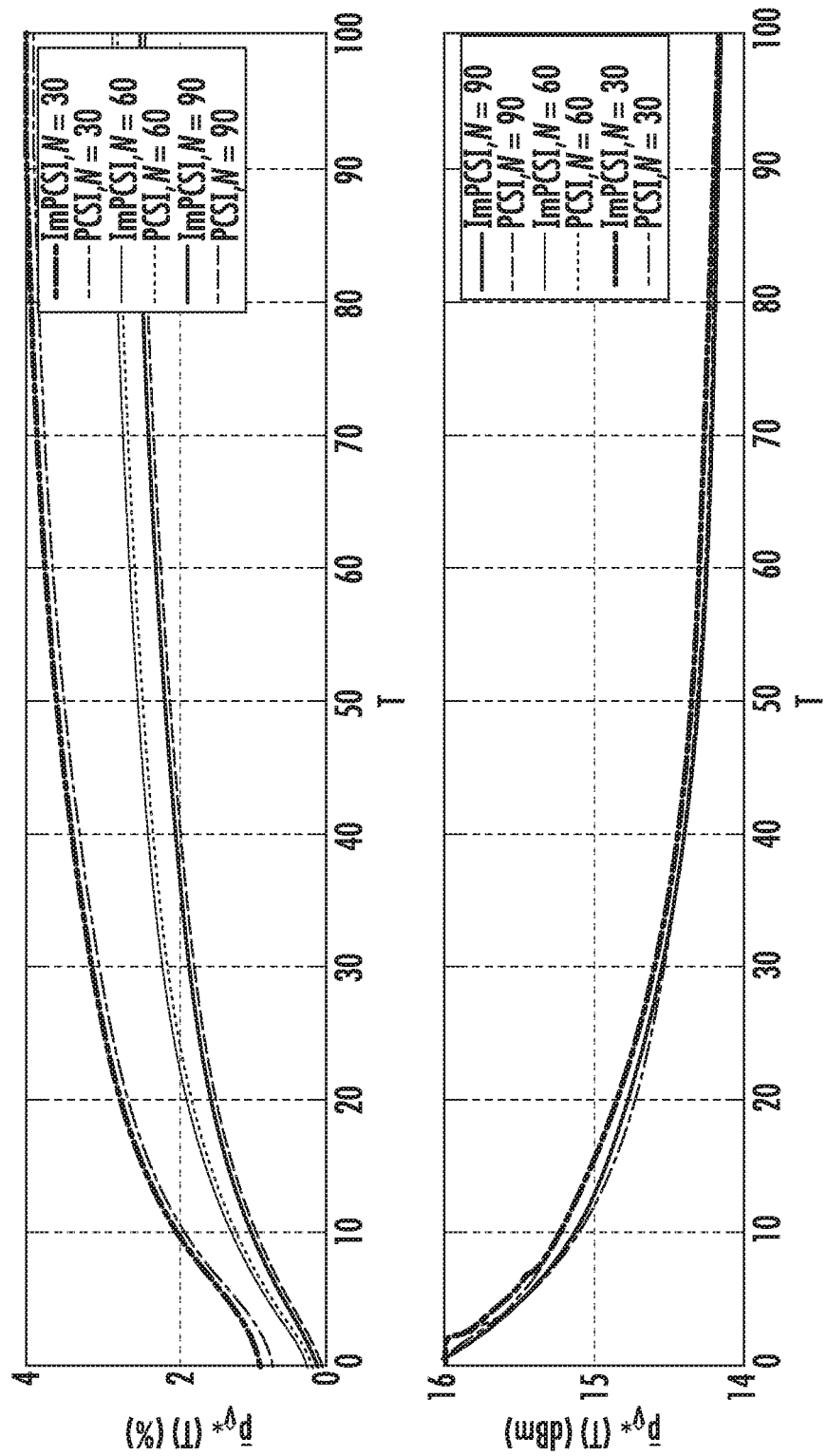
FIGS. 18 and 19 are graphs showing the performance of an algorithm with different numbers of BS antennas.
Figure 19:
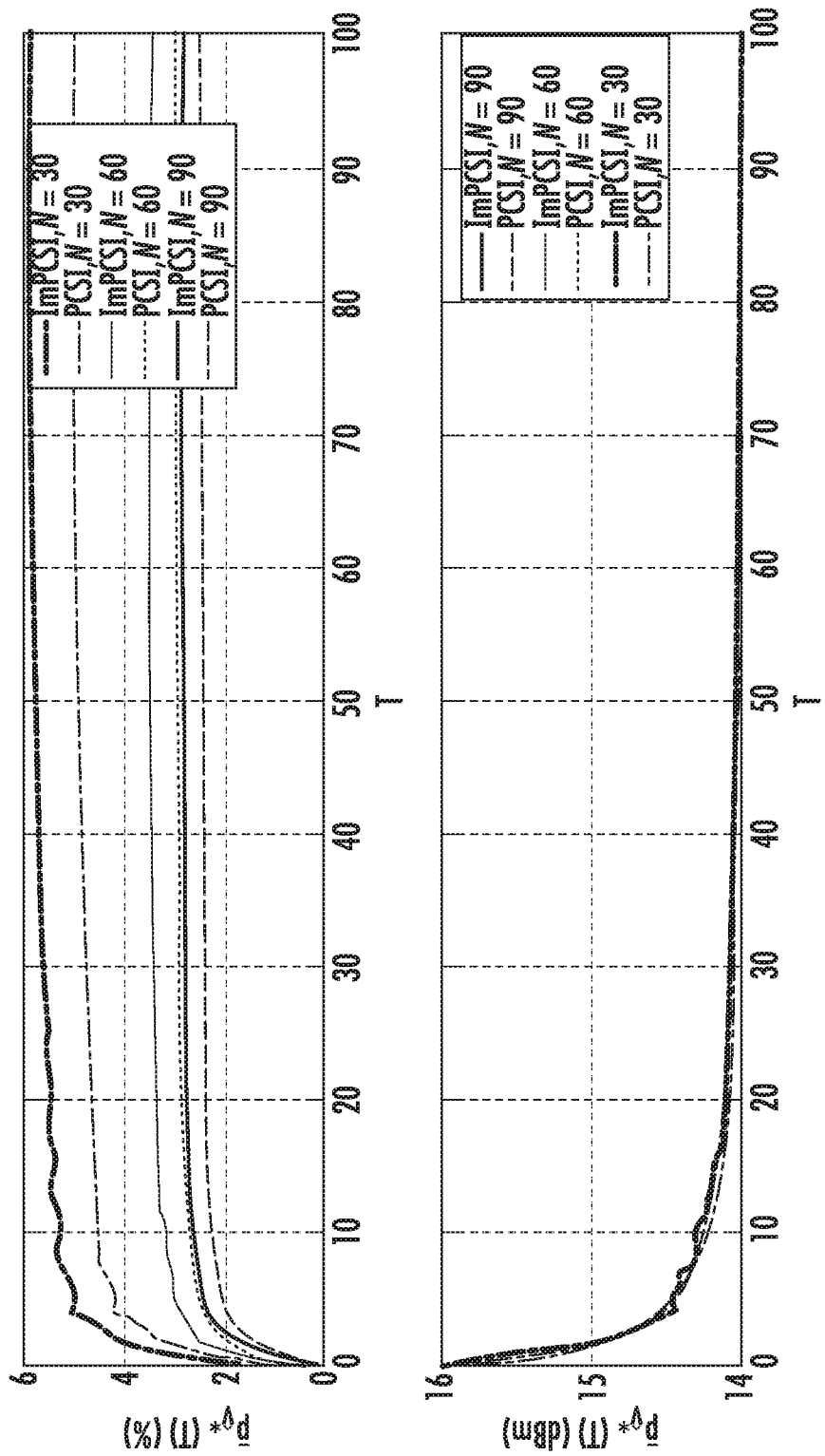

The performance of the algorithm using different numbers of network node antennas is shown in FIGS. 18 and 19. As the number of antennas increases, the stable value of $\overline{\rho}_{\hat{V}*}(T)$ decreases since the InP has more freedom for downlink beamforming to mitigate the inter-SP interference, Thus the service quality increases, indicating the advantages of massive MIMO. The performance gap between the inaccurate and accurate CSI cases also decreases as the number of antennas increases. The impacts of the number of network node antennas on the algorithm convergence and $\overline{P}_{\hat{V}*}(T)$ are observed to be negligible.

Comparison with Non-Virtualized System

Further compared is the system throughput between the method described herein and a non-virtualized system under the same short-term and long-term network node power constraints. For the non-virtualized system, assume the InP serves all end users directly and designs the actual downlink precoding matrix $\hat{V}_{InP}(t)$ under inaccurate CSI $\hat{H}(t)$ at every time slot t≥0. The InP maximizes the expected system throughput subject to both short-term and long-term network node power constraints through optimizing network node power allocation with either MF or ZF precoding as follows:

$$\min_{\{\alpha(t)\}} \lim_{T\to\infty} \frac{1}{T}\sum_{t=0}^{T-1} \mathbb{E}\{-\sum_{k=1}^{K} R_k(t)\} \quad \text{P3}$$

$$\text{s.t.} \quad \lim_{T\to\infty} \frac{1}{T}\sum_{t=0}^{T-1} \mathbb{E}\{\alpha^2(t)\|W(t)\|_F^2\} \le \overline{P},$$

$$\alpha^2(t)\|W(t)\|_F^2 \le P_{max}$$

where $$R_k(t) = \log_2\left(1 + \frac{\alpha^2(t)|h_k(t)w_k^T(t)|^2}{\sigma_n^2 + \alpha^2(t)\sum_{k'\ne k}^{K}|h_{k'}(t)w_{k'}^T(t)|}\right), \forall k \in \mathcal{K},$$

$$W(t) = \begin{cases} H^H(t), & \text{if InP adopts } MF, \\ H^H(t)(H(t)H^H(t))^{-1}, & \text{if InP adopts } ZF. \end{cases}$$

The Lyapunov optimization is leveraged by introducing a virtual queue Z'(t) with update rule:

$$Z'(t+1)=\max\{Z'(t)+\hat{\alpha}^2(t)\|\hat{W}(t)\|_F^2-\overline{P},0\},\forall t\ge 0$$

to convert P3 to the following per-slot problem with U'>0

$$\min_{\hat{\alpha}(t)} -U'\sum_{k=1}^{K} \hat{R}_k(t) + Z'(t)\hat{\alpha}^2(t)\|\hat{W}(t)\|_F^2 \quad \text{P4}$$

$$\text{s.t.} \quad \hat{\alpha}^2(t)\|\hat{W}(t)\|_F^2 \le P_{max}$$

which is convex in $\hat{\alpha}(t)$ and can be solved by studying the KKT conditions. The InP in a non-virtualized system maximizes the expected system throughput by observing Z'(t) and $\hat{H}(t)$ at every time slot t≥0, solving P4 to obtain the actual downlink precoding matrix $\hat{V}_{InP}*(t)=\hat{\alpha}*(t)\hat{W}(t)$ and then updating the virtual queue.

Figure 20:
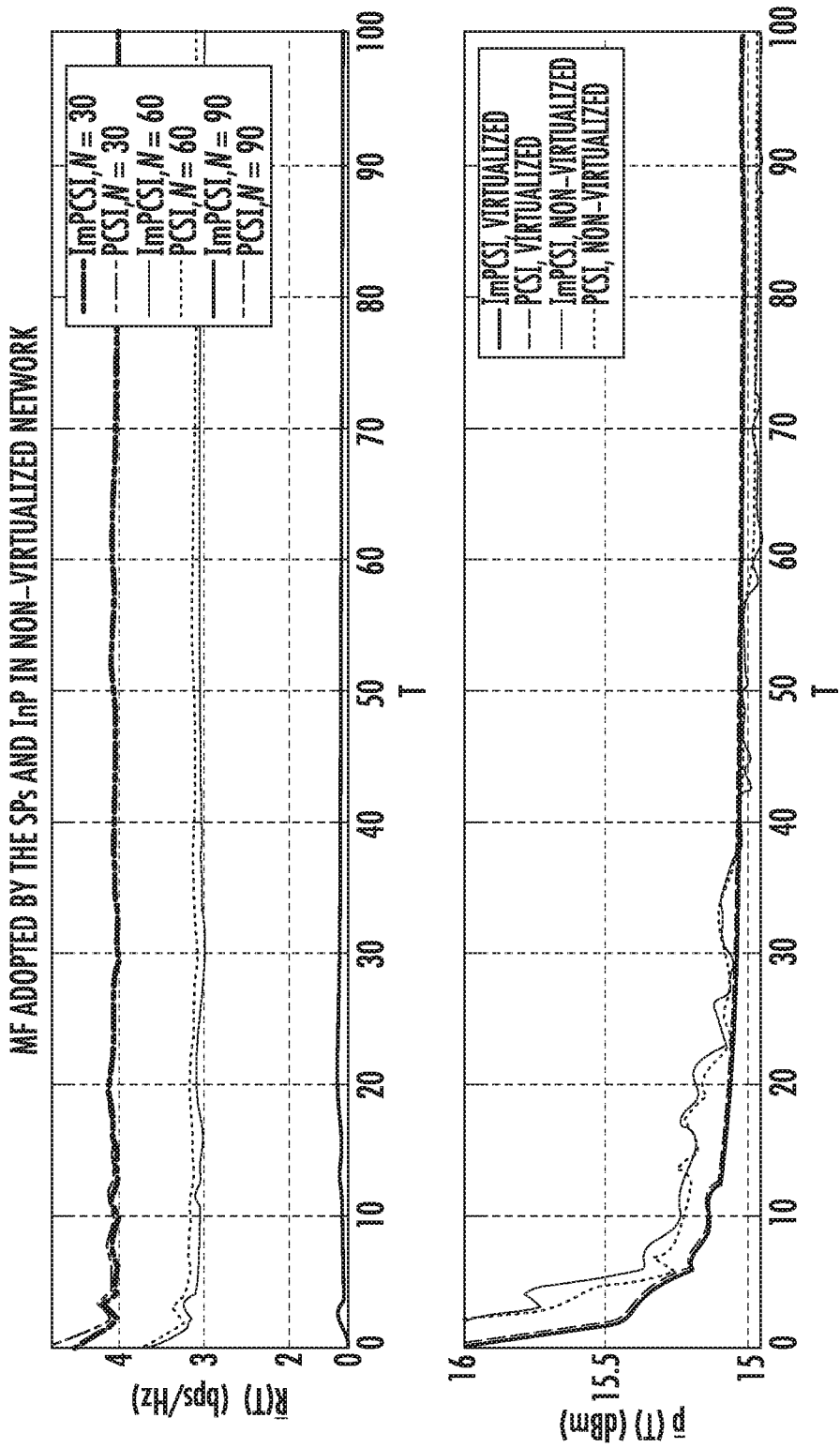
FIGS. 20 and 21 are graphs showing a time average spectral efficiency per user.
Figure 21:
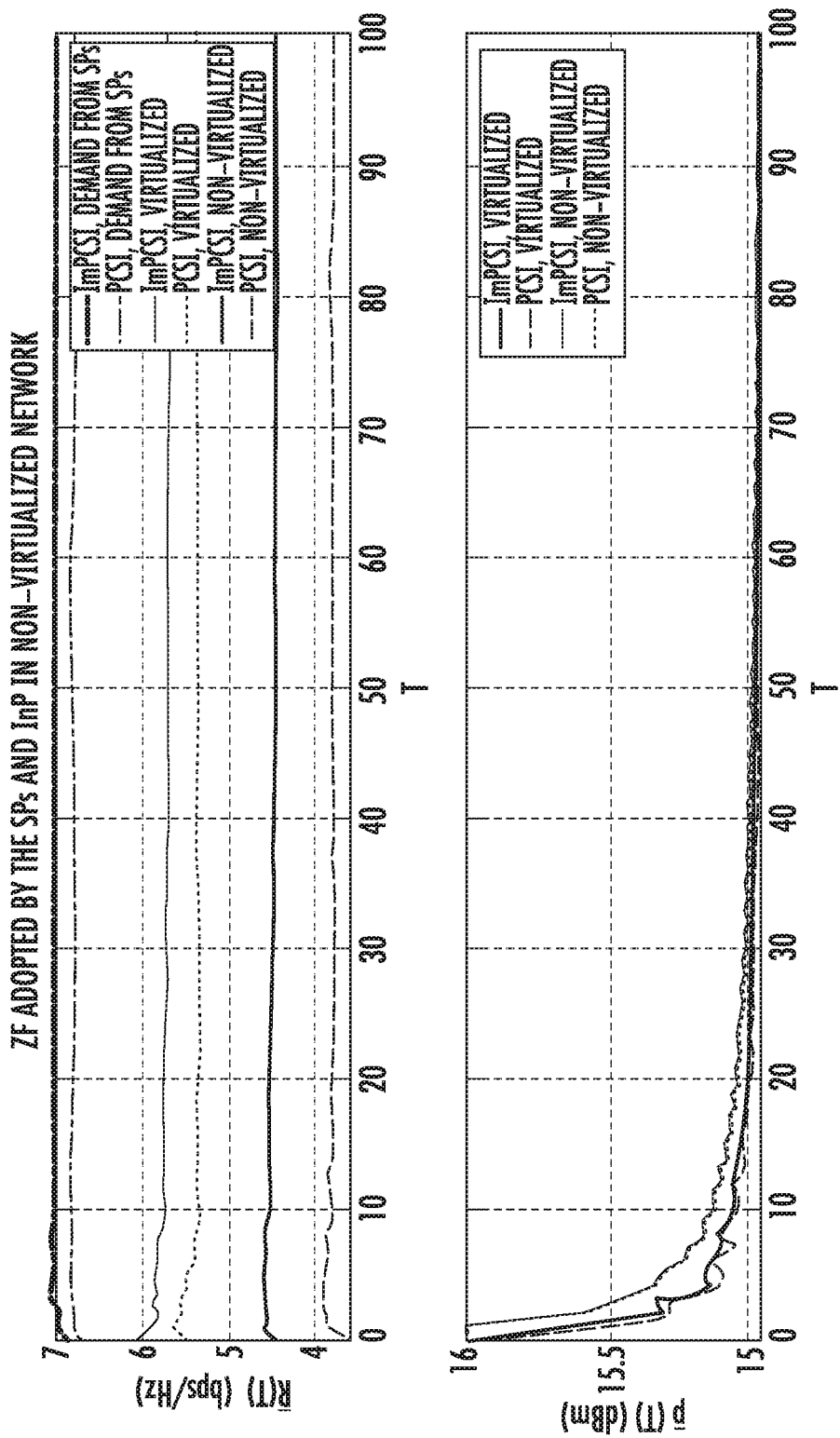

FIGS. 20 and 21 show the time average spectral efficiency per user $$\overline{R}(T) \triangleq \frac{1}{TK}\sum_{t=0}^{T-1}\sum_{k=1}^{K} R_k(t)$$

achieved by the virtualized and non-virtualized networks with $\overline{P}$=15 dBm when all SPs and the InP adopt MF and ZF precoding in the non-virtualized system, respectively. Note that the spectral efficiency demand from the SPs is higher than the actual spectral efficiency achieved, since the SPs design their precoding matrices requesting maximum network node power, for example, $P_{max}$=16 dBm, without considering interferences from the other SPs. Compared with the non-virtualized network, a virtualized network adopting the online MIMO WNV algorithm described herein provides the SPs with the flexibility to design their own precoding matrices and achieves higher spectral efficiency. The higher spectral efficiency comes from the fact that the online precoding minimizes the expected deviation of received signals at users while handling the inter-SP interference, which improves the system throughput under a limited network node power budget.

Thus, some embodiments provide an online MIMO WNV algorithm with unknown CDI and inaccurate CSI. The algorithm may be designed assuming only that the channel gain and the normalized channel inaccuracy measure are bounded (e.g., the channel inaccuracy measure can even be biased due to quantization errors).

The expected deviation of received signals at the users between the SPs' virtual precoding and the InP's actual precoding may be minimized, subject to both long-term and short-term network node power constraints.

The online precoding solution may be of semi-closed form, resembling a water-filling precoding solution that may be of low computational complexity and may be not complex to implement. The algorithm works with any precoding schemes adopted by the SPs to design their own virtual precoding matrices.

Some embodiments encompass practical scenarios in which the SPs adopt common precoding schemes to illustrate system performance. The SPs are allowed to choose either MF precoding to maximize the SNR or ZF precoding to null the inter-user interference. In addition, the SPs can request the amount of network node power according to any pre-agreed power allocation strategy between the InP and the SPs.

Under accurate CSI, the algorithm may not require prior knowledge of the CDI but may be able to perform arbitrarily close to the optimality that can be achieved by having the CDI.

Under inaccurate CSI, the algorithm may not require prior knowledge of the CDI but may perform arbitrarily close to an O(δ) performance gap. This may result in optimality that can be achieved with accurate CSI and the knowledge of CDI.

The performance of the algorithm has been validated under typical LTE network settings considering different precoding schemes adopted by the SPs, different average network node power limit, different channel inaccuracies, and different numbers of network node antennas. Fast convergence and the ability to trace the evolution of channel distributions over time is observed.

A virtualized wireless network adopting some embodiments of the algorithm provides SPs with the flexibility to design their own precoding matrices and achieves higher system throughput compared with a non-virtualized system serving all users directly with MF or ZF precoding.

Thus, according to one aspect, a network node 16 configured to communicate with a wireless device 22 (WD), includes processing circuitry configured to perform downlink wireless network virtualization by minimizing an expected deviation of received signals at WDs 22 subject to network node power constraints.

According to this aspect, in some embodiments, the minimization of the expected deviation is based at least in part on a deviation between a service provider's virtual precoding and an infrastructure provider's actual precoding. In some embodiments, the minimization is further based at least in part on inter-service provider interference. In some embodiments, the minimization is based at least in part on inaccurate channel state information. In some embodiments, the minimization is performed without knowledge of channel distribution information. In some embodiments, the virtualization is bounded when service providers use either match filtering or zero forcing methods to compute their virtual precoding matrices.

According to one aspect, a network node 16 is configured to communicate with a wireless device 22. The network node 16 includes processing circuitry 68 configured to perform downlink wireless network virtualization by minimizing an expected deviation of received signals at WDs 22 subject to power constraints on the network node 16.

According to this aspect, in some embodiments, the expected deviation is between a service provider's virtual precoding and an infrastructure provider's actual precoding. In some embodiments, the minimizing is based at least in part on interference between service providers. In some embodiments, the minimizing includes applying a drift-plus-penalty technique for stochastic network optimization based on inaccurate channel state information. In some embodiments, the power constraints include at least one short term power constraint and at least one long term power constraint. In some embodiments, the minimizing is performed without knowledge of channel distribution information. In some embodiments, each service provider independently determines a virtual precoding matrix of the service provider. In some embodiments, a virtual precoding matrix determined by a service provider is associated with a pre-determined downlink power. In some embodiments, the minimizing occurs within a $$o\left(\frac{1}{\epsilon^2}\right)$$

convergence time to reach an $\in$-approximate solution. In some embodiments, the downlink wireless network virtualization is bounded when all service providers' determinations of virtual precoding matrices include match filtering or zero forcing.

According to another aspect, a method in a network node 16 is configured to communicate with a wireless device, WD 22. The method includes performing, via the processing circuitry 68, downlink wireless network virtualization by minimizing an expected deviation of received signals at WDs 22 subject to power constraints on the network node 16.

In some embodiments, the expected deviation is between a service provider's virtual precoding and an infrastructure provider's actual precoding. In some embodiments, the minimizing is based at least in part on interference between service providers. In some embodiments, the minimizing includes applying a drift-plus-penalty technique for stochastic network optimization based on inaccurate channel state information. In some embodiments, the power constraints include at least one short term power constraint and at least one long term power constraint. In some embodiments, the minimizing is performed without knowledge of channel distribution information. In some embodiments, each service provider independently determines a virtual precoding matrix of the service provider. In some embodiments, a virtual precoding matrix determined by a service provider is associated with a pre-determined downlink power. In some embodiments, the minimizing occurs within an $$o\left(\frac{1}{\epsilon^2}\right)$$

convergence time to reach an $\in$-approximate solution. In some embodiments, the downlink wireless network virtualization is bounded when all service providers' determinations of virtual precoding matrices include match filtering or zero forcing.

Embodiment A1. A network node configured to communicate with a wireless device 22 (WD), the network node configured to, and/or comprising a radio interface and/or comprising processing circuitry configured to:

perform downlink wireless network virtualization by minimizing an expected deviation of received signals at WDs subject to network node power constraints.

Embodiment A2. The network node of Embodiment A1, wherein the minimization of the expected deviation is based at least in part on a deviation between a service provider's virtual precoding and an infrastructure provider's actual precoding.

Embodiment A3. The network node of Embodiment A2, wherein the minimization is further based at least in part on inter-service provider interference.

Embodiment A4. The network node of any of Embodiments A1-A3, wherein the minimization is based at least in part on inaccurate channel state information.

Embodiment A5. The network node of any of Embodiments A1-A4, wherein the minimization is performed without knowledge of channel distribution information.

Embodiment A6. The network node of any of Embodiments A1-A5, wherein the virtualization is bounded when service providers use either match filtering or zero forcing methods to compute their virtual precoding matrices.

Embodiment B1. A method implemented in a network node, the method comprising:

performing downlink wireless network virtualization by minimizing an expected deviation of received signals at WDs subject to network node power constraints.

Embodiment B2. The method of Embodiment B1, wherein the minimization of the expected deviation is based at least in part on a deviation between a service provider's virtual precoding and an infrastructure provider's actual precoding.

Embodiment B3. The method of Embodiment B2, wherein the minimization is further based at least in part on inter-service provider interference.

Embodiment B4. The method of any of Embodiments B1-B3, wherein the minimization is based at least in part on inaccurate channel state information.

Embodiment B5. The method of any of Embodiments B1-B4, wherein the minimization is performed without knowledge of channel distribution information.

Embodiment B6. The method of any of Embodiments B1-B5, wherein the virtualization is bounded when service providers use either match filtering or zero forcing methods to compute their virtual precoding matrices.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java@ or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
5G: Fifth Generation
BS: Base Station
CDI: Channel Distribution Information
CSI: Channel State Information
C-RAN: Cloud Radio Access Networks
DPP: Drift Plus Penalty
InP: Infrastructure Provider
I.I.D.: Independent and Identically Distributed
MF: Matched Filter
MIMO: Multiple Input Multiple Output
MMSE: Minimum Mean Square Error
NOMA: Non-orthogonal Multiple Access
OFDM: Orthogonal Frequency Division Multiplexing
QoS: Quality of Service
SP: Service Provider
TDD: Time Division Duplex
WNV: Wireless Network Virtualization
ZF: Zero Forcing It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, WD, the network node comprising processing circuitry configured to:

perform downlink wireless network virtualization by minimizing an expected deviation of received signals at WDs subject to power constraints on the network node.

2. The network node of claim 1, wherein the expected deviation is between a service provider's virtual precoding and an infrastructure provider's actual precoding.

3. The network node of claim 2, wherein each service provider independently determines a virtual precoding matrix of the service provider.

4. The network node of claim 2, wherein a virtual precoding matrix determined by a service provider is associated with a pre-determined downlink power.

5. The network node of claim 2, wherein the downlink wireless network virtualization is bounded when all service providers' determinations of virtual precoding matrices include match filtering or zero forcing.

6. The network node of claim 1, wherein the minimizing is based at least in part on interference between service providers.

7. The network node of claim 1, wherein the minimizing includes applying a drift-plus-penalty technique for stochastic network optimization based on inaccurate channel state information.

8. The network node of claim 1, wherein the power constraints include at least one short term power constraint and at least one long term power constraint.

9. The network node of claim 1, wherein the minimizing is performed without knowledge of channel distribution information.

10. The network node of claim 1, wherein the minimizing occurs within a $$o\left(\frac{1}{\epsilon^2}\right)$$

convergence time to reach an $\in$-approximate solution, where $\in$ is a controllable constant.

11. A method in a network node configured to communicate with a wireless device, WD, the method comprising: performing downlink wireless network virtualization by minimizing an expected deviation of received signals at WDs subject to power constraints on the network node.

12. The method of claim 11, wherein the expected deviation is between a service provider's virtual precoding and an infrastructure provider's actual precoding.

13. The method of claim 12, wherein each service provider independently determines a virtual precoding matrix of the service provider.

14. The method of claim 12, wherein a virtual precoding matrix determined by a service provider is associated with a pre-determined downlink power.

15. The method of claim 12, wherein the downlink wireless network virtualization is bounded when all service providers' determinations of virtual precoding matrices include match filtering or zero forcing.

16. The method of claim 11, wherein the minimizing is based at least in part on interference between service providers.

17. The method of claim 11, wherein the minimizing includes applying a drift-plus-penalty technique for stochastic network optimization based on inaccurate channel state information.

18. The method of claim 11, wherein the power constraints include at least one short term power constraint and at least one long term power constraint.

19. The method of claim 11, wherein the minimizing is performed without knowledge of channel distribution information.

20. The method of claim 11, wherein the minimizing occurs within an $$o\left(\frac{1}{\epsilon^2}\right)$$

convergence time to reach an $\in$-approximate solution, where $\in$ is a controllable constant.

* * * * *